US011278808B1

(12) United States Patent
Knutsson et al.

(10) Patent No.: US 11,278,808 B1
(45) Date of Patent: Mar. 22, 2022

(54) COMPUTER DEVICE CONFIGURED TO PROVIDE A GAME AND METHOD FOR MOVING GAME ENTITIES FROM A GAME BOARD AREA TO AN INTERACTION AREA

(71) Applicant: KING.COM LIMITED, St. Julians (MT)

(72) Inventors: Sebastian Knutsson, Stockholm (SE); Klas Norden, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 17/108,443

(22) Filed: Dec. 1, 2020

Related U.S. Application Data

(60) Provisional application No. 63/078,581, filed on Sep. 15, 2020.

(51) Int. Cl.
*A63F 13/537* (2014.01)
(52) U.S. Cl.
CPC .................................. *A63F 13/537* (2014.09)
(58) Field of Classification Search
CPC .. A63F 13/537; A63F 13/822; A63F 3/00097; A63F 2003/00996; A63F 13/80; A63F 13/52; A63F 9/0612; A63F 13/00; A63F 3/02; A63F 2003/00463; G06F 3/04842
See application file for complete search history.

(56) References Cited

U.S. PATENT DOCUMENTS

| | | | | |
|---|---|---|---|---|
| 2008/0125220 | A1* | 5/2008 | Sakaguchi | A63F 13/46 463/32 |
| 2017/0072297 | A1* | 3/2017 | Lehwalder | A63F 13/537 |
| 2017/0072311 | A1* | 3/2017 | Maejima | A63F 13/92 |

OTHER PUBLICATIONS

YouTube video, "Beginner's Guide to E&P Ep. 03—Maps, Quests and Events," dated Apr. 17, 2019, downloaded from https://www.youtube.com/watch?v=TbvNXK5ZSpc (Year: 2019).*
YouTube video, "Gems of War: Xbox One video review," dated Nov. 22, 2015, downloaded from https://www.youtube.com/watch?v=756EEvVfykk (Year: 2015).*
YouTube video, "Starcraft Bw—Protoss v Protoss," dated Aug. 23, 2018, downloaded from https://www.youtube.com/watch?v=2UpXMzFLB_A&t=531s (Year: 2018).*
YouTube video, "Heroes of Magic," dated Jul. 19, 2018, downloaded from https://www.youtube.com/watch?v=phosfTxlmNU (Year: 2018).*

* cited by examiner

*Primary Examiner* — Eric J Yoon
(74) *Attorney, Agent, or Firm* — Saul Ewing Arnstein & Lehr LLP

(57) ABSTRACT

A computer device is configured to provide a computer implemented game. At least one processor of the computer device is configured to determine that one more matches have been made by a plurality of game elements in a game board area and in response to provide one or more game entities in the game board area. The at least one processor is configured to control one or more of the game entities to move from the game board area to an interaction area.

25 Claims, 23 Drawing Sheets

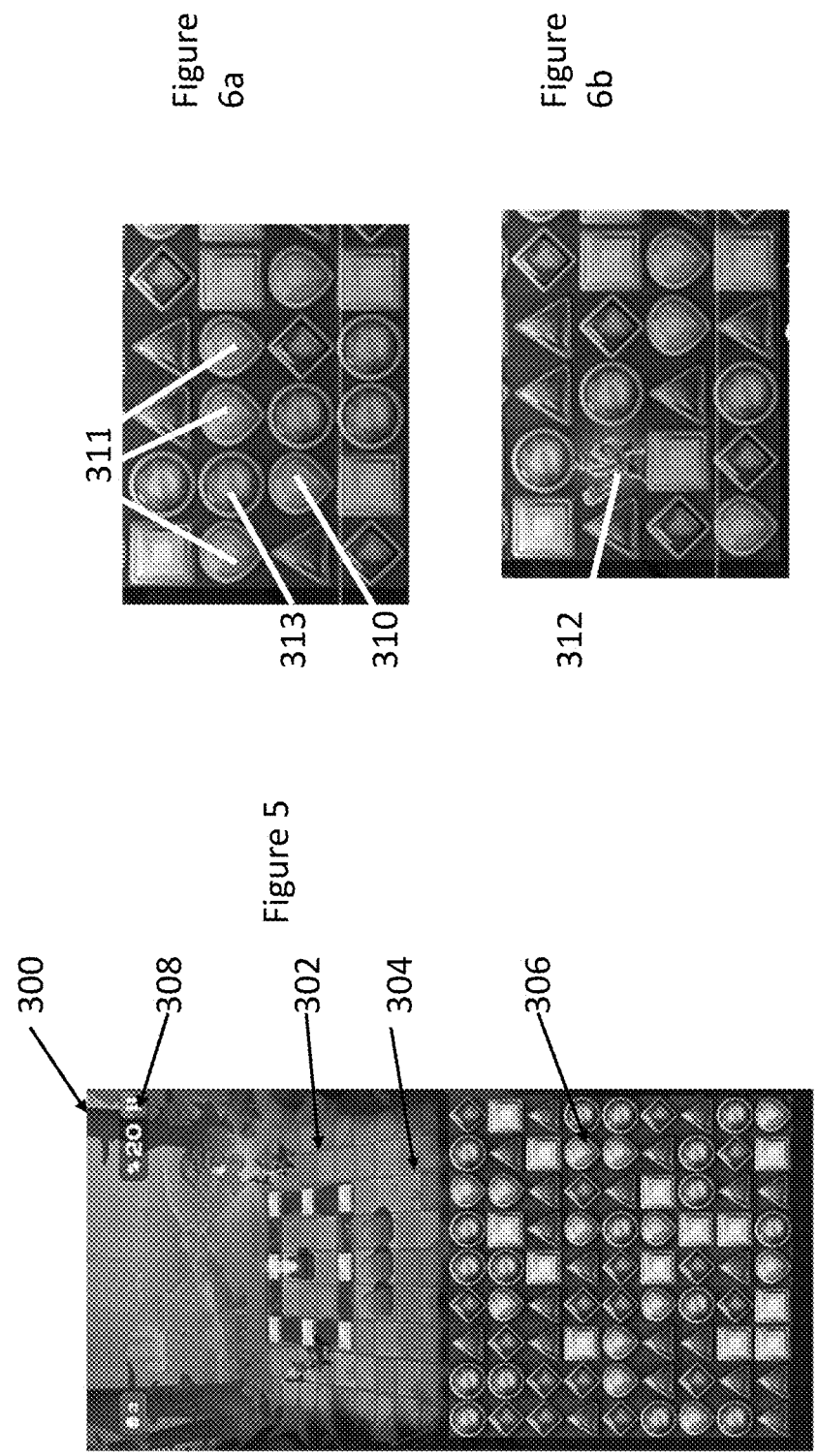

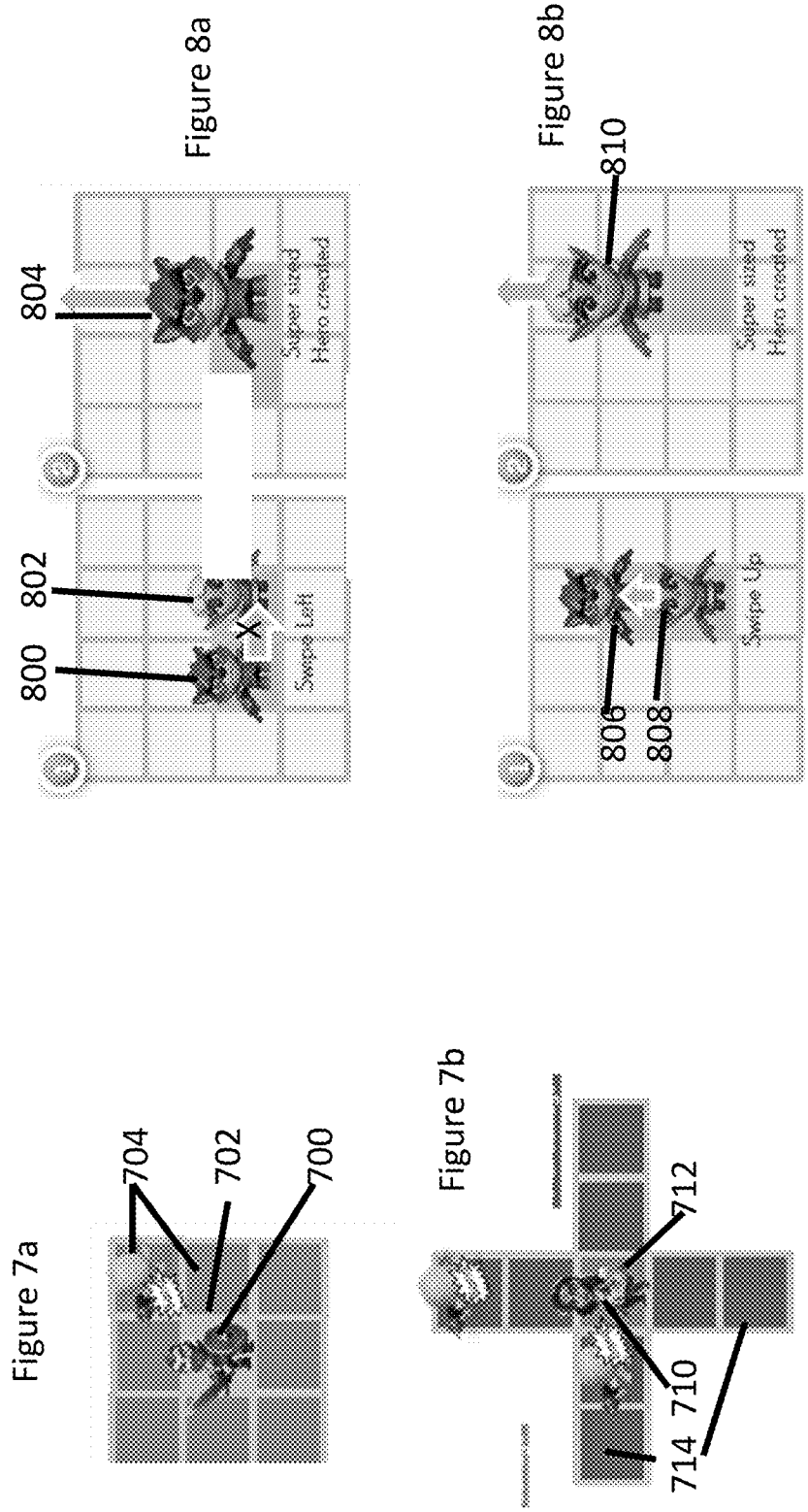

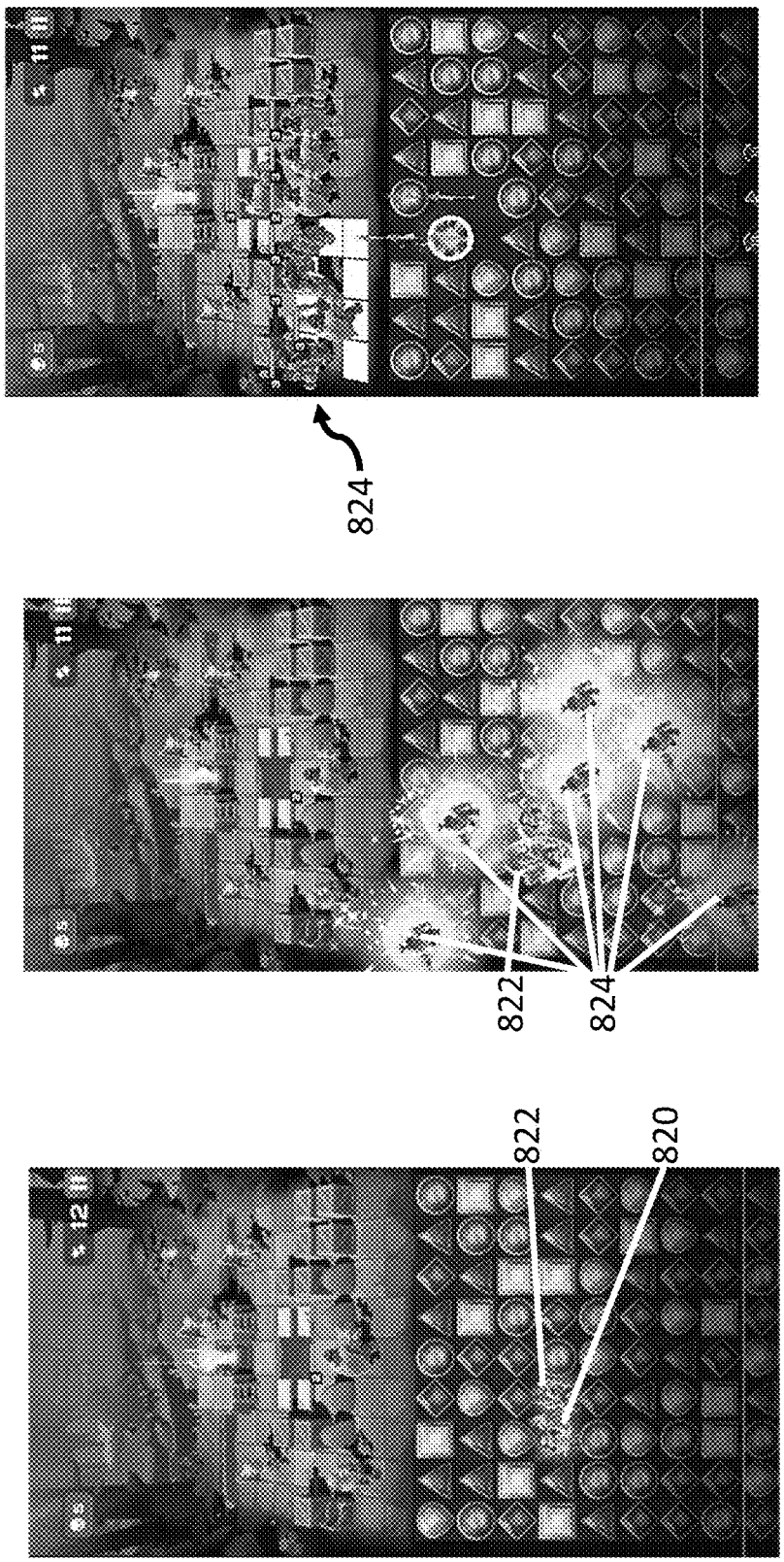

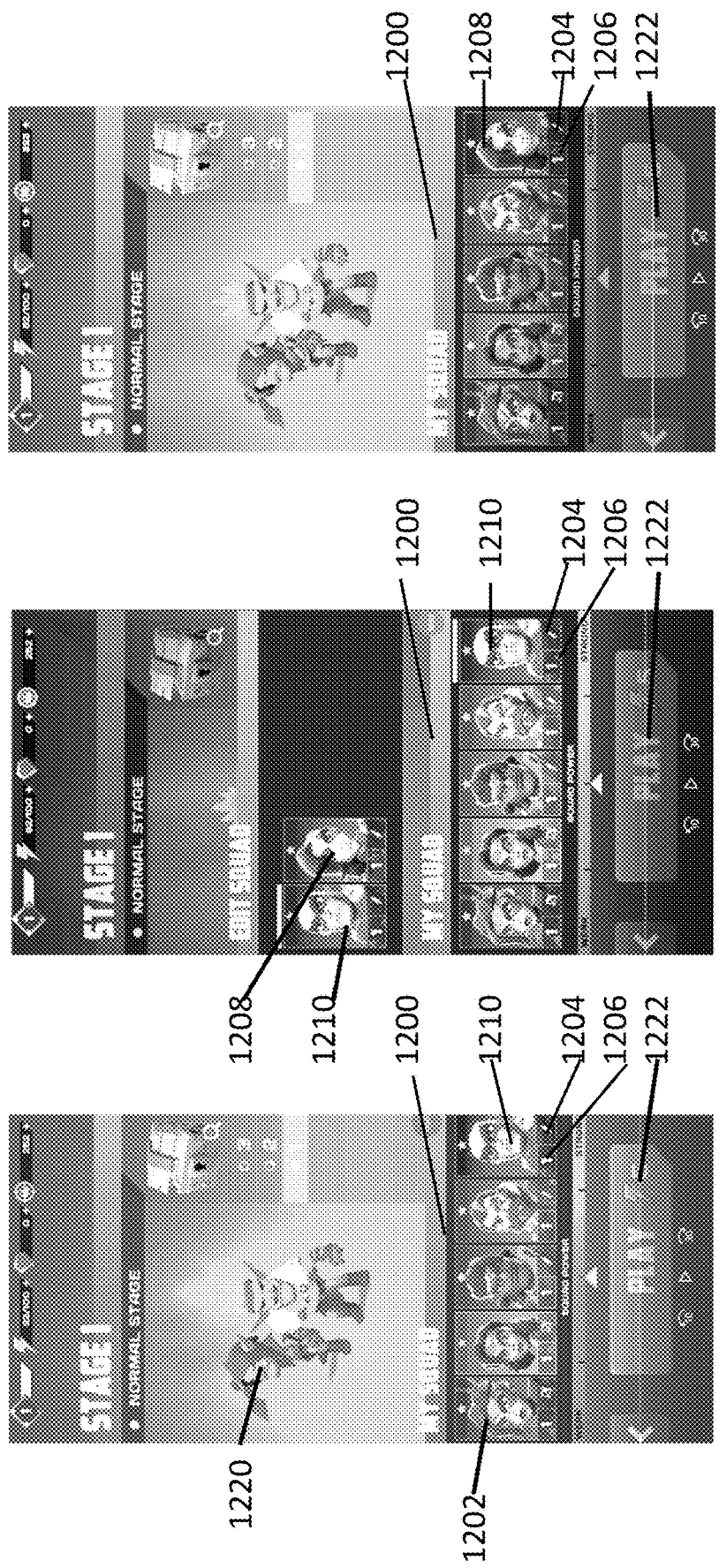

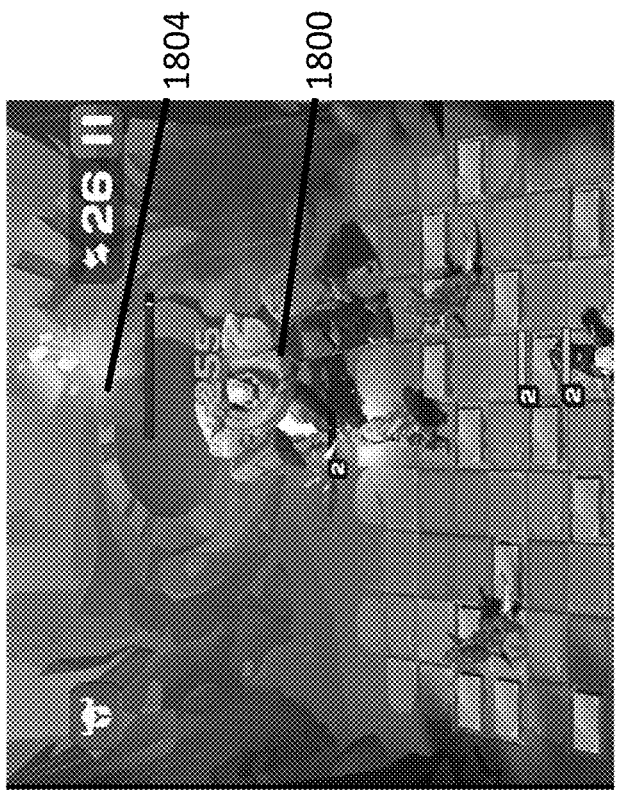
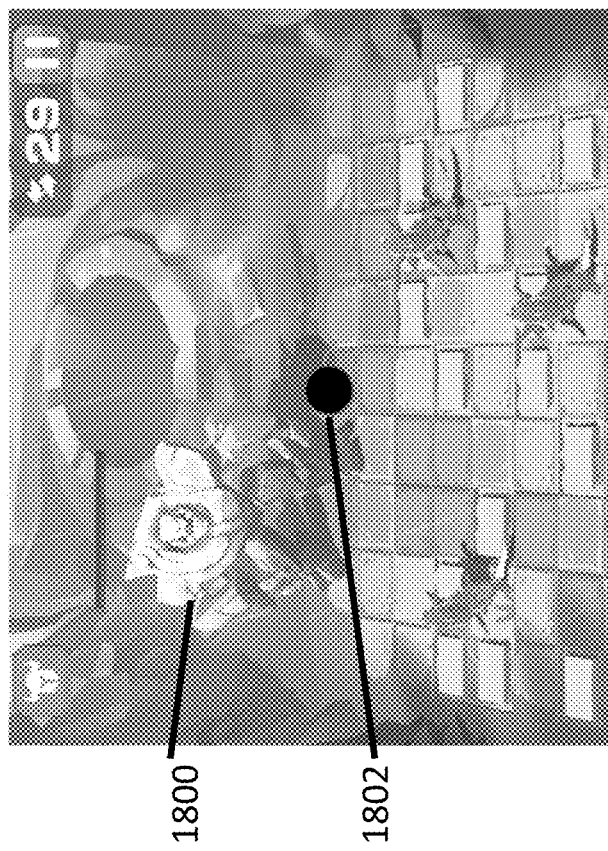
Figure 18b
Figure 18a

COMPUTER DEVICE CONFIGURED TO PROVIDE A GAME AND METHOD FOR MOVING GAME ENTITIES FROM A GAME BOARD AREA TO AN INTERACTION AREA

CROSS-REFERENCE TO RELATED APPLICATIONS

This application is based on, and claims priority to, U.S. Provisional Application No. 63/078,581, filed on Sep. 15, 2020, the entire contents of which being fully incorporated herein by reference.

FIELD OF THE INVENTION

Some embodiments of this application relate to a computer device configured to provide a computer implemented game.

Some embodiments may relate to providing a computer device which is configured to provide a computer implemented game which is engaging to users or players.

Some embodiments relate to controlling a user interface responsive to user engagement with displayed game elements on the user interface of a computer device.

Some embodiments may have particular, but not exclusive application in the field of computer implemented games for example games, in an online or offline environment, and computing devices therefor.

BACKGROUND OF THE INVENTION

In the field of computer-implemented games, there are many technical challenges facing the designer such that a computer device is configured to provide such games. For example, there may be considerations relating to how, for example, the user interface of the computer device is to be controlled when a user is playing a computer implemented game.

One technical challenge relates to the configuring of the computer device to allow a computer implemented game to be fun and compelling even when there is limited display resource available. This may be a particular technical challenge when the computer implemented game is being played on a smartphone, tablet or other minicomputer. A limited display resource provides challenges such as how a user can interact with a particular part of the display. Another challenge relates to how to provide relative complexity which is able to be rendered in a visual distinct manner on the relatively small display.

Another significant challenge relates to the configuring of computer device to provide a computer implemented game which is engaging to the user. Engagement involves configuring the computer device to provide a computer implemented game with game play which is engaging and rewarding to players. This typically requires a computer device to be configured to provide a computer implemented game which is easily understood at its simplest or introductory levels, providing rewarding gameplay with quite simple game mechanics, but becoming progressively more challenging so that players are not bored, but remain engaged and develop rewarding skills. Effective engagement requires that the computer device be configured to provide various forms of feedback to reinforce player sense of success and accomplishment.

This may need to be provided in the context of an environment where a limited number of resources of a computing device can be used in running the computer implemented game.

There are technical challenges in configuring a computer device to provide a computer implemented game with complexity in the game play particularly where the computer device has a limited available user interface and/or screen. The user interface and screen may be provided by a common touch screen.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element in the game board area and those matched elements will then disappear.

One or more of the technical challenges discussed previously arise when introducing complexity into such match games.

This patent specification describes not only various ideas and functions, but also their creative expression. A portion of the disclosure of this patent document therefore contains material to which a claim for copyright is made and notice is hereby given: Copyright King.com Limited 2020 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by any one of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to one aspect, there is provided a computer device configured to provide a computer implemented game, the computer device comprising: a display configured to display a game board area of the computer implemented game and an interaction area of the computer implemented game, the game board area comprising a plurality of game elements; a user interface configured to receive user input interacting with the game board area to make a move; and at least one processor configured to determine that one more match conditions have been satisfied by a plurality of game elements in the game board area and in response to provide one or more game entities at respective positions in the game board area, the at least one processor being configured to control one or more of the one or more game entities to move from the game board area to the interaction area.

The at least one processor may be configured to control a visualization of the one or more game entities to be the same in the game board area and in the interaction area.

The at least one processor may be configured to control a visualization of the one or more game entities in the game board to be different to a visualization of the one or more game entities in the interaction area.

The at least one processor may be configured to generate the one or more game entities and to cause the display to display the generated one or more game entities at the respective positions in the game board area.

The at least one processor may be configured to control one or more of the one or more game entities to move to a respective position in the interaction area in dependence on a location of the respective game entity in the game board area.

The game board area may comprise a plurality of rows and columns. The plurality of rows and column of the game board area may define positions for the plurality of game elements. The interaction area may comprise a plurality of rows and columns. The plurality of rows and columns of the interaction area may define positions for the game entities.

One of the rows and columns of the game board area may be aligned with a corresponding one of the rows and columns of the interaction area.

The at least one processor may be configured to cause the game entity to move from a respective column or row of the game board area to a respective corresponding column or row of the interaction area.

The interaction area may be a battle area.

The at least one processor may be configured to cause the one or more game entities moved from the first game board area to the interaction area to interact with one or more interaction entities provided in the interaction area.

The user interface may be configured to receive a user input selecting a game entity and in response to that user input, the at least one processor may be configured to cause the selected game entity to move from the game board area to the interaction area.

The at least one processor may be configured to cause the selected game entity to move from a row or column of the game board area having the selected game entity to move to the corresponding row or column of the interaction area.

The user interface may be configured to receive a user input selecting and moving a game entity and in response to that user input, the at least one processor may be configured to cause the selected game entity to move from the game board area to the interaction area.

The at least one processor may be configured to cause the selected game entity to move from a row or column of the game board area having a position to which the selected game entity is moved by the user input and to cause the selected game entity to move to the corresponding row or column of the interaction area.

The at least one processor may be configured to provide an interaction pattern for a respective game entity.

The interaction pattern may occupy a plurality of positions of the interaction area. The interaction pattern may move as the game entity moves.

The at least one processor may be configured to cause the one or more game entities moved from the game board area to the interaction area to interact with one or more interaction entities located in a respective interaction pattern of the respective game entity.

The interaction may be to remove one or more interaction entities.

The interaction may be to reduce a health of one or more interaction entities.

The user interface may be configured to receive user input to select a game entity and in response the at least one processor may be configured to cause the display to highlight a path that would be taken by the game entity when moving to the interaction area.

The user interface may be configured to receive user input to select a game entity and in response the at least one processor may be configured to cause the display to highlight a path that would be taken by the game entity when moving to the interaction area and to highlight a respective interaction pattern associated with the game entity.

The at least one processor may be configured to highlight a position of one or more interaction entities with respect to the interaction pattern associated with the game entity.

The at least one processor may be configured to highlight the path and/or the respective interaction pattern while user input received via the user interface is selecting the game entity.

The at least one processor may be configured to highlight the path and/or the respective interaction when the user input received via the user interface has selecting and moved the game entity.

The at least one processor may be configured to determine a respective position in the interaction area for one or more game entities.

The at least one processor may be configured to determine a respective position in the interaction area for one or more game entities in dependence on the position of one or more interaction entities.

The at least one processor may be configured to determine a respective position in the interaction area for one or more game entities in dependence on the position of one or more other game entities.

The at least one at least one processor is configured to determine a position in the interaction area for a game entity in dependence on an interaction pattern of that game entity.

The at least one at least one processor is configured to determine a position in the interaction area for a game entity in dependence on an interaction pattern of that game entity and on respective positions of one or more interaction entities.

The at least one processor may be configured to cause a plurality of game entities to move to the interaction area and to determine an order for the plurality of game entities in dependence on respective interaction patterns of the respective game entities.

In some embodiments, the at least one processor may be configured to determine a number of game elements satisfying a match condition and in response to select one of a plurality of different game entities to be provided.

In some embodiments, the at least one processor may be configured to determine a matching characteristic of game elements satisfying a match condition and in response to select one of a plurality of different game entities to be provided.

In some embodiments, the at least one processor is configured to determine that one or more match conditions have been satisfied in response to the user input selecting one or more game elements in the game board area to make a move.

In some embodiments, the at least one processor may be configured to determine that one or more match conditions have been satisfied in response to a rearrangement and/or replenishment of the game board area.

In some embodiments, the user interface may be configured to receive user input which results in the selection of two game entities and in response the at least one processor is configured to provide one entity which differs in at least one respect to the selected two game entities.

In some embodiments, the user interface may be configured to receive user input which results in the selection of two game entities and in response the at least one processor may be configured to provide one entity which differs in at least one respect to the selected two game entities and which is controlled by the at least one processor to move from the game board area to the interaction area.

The one entity may differ from the selected two game entities in that the one entity may have a greater effect in the interaction area in at least one respect as compared to at least one of the selected two game entities.

The one entity may have an increased size as compared to the selected two game entities.

The at least one processor may be configured such that the one entity having an increased size is controlled as occupying a single position in the interaction area The user input which results in the selecting of two game entities may comprise moving one of the two game entities to a position of the other game entity.

The one entity may have at least one same characteristic as the game entity which is moved to the position of the other game entity.

In some embodiments, the user interface may be configured to receive user input which results in the selection of two game entities and in response the at least one processor may be configured to provide a set of game entities comprising at least three game entities.

The user input which results in the selecting of two game entities may comprise moving one of the two game entities to a position of the other game element.

In some embodiments, the user interface may be configured to receive user input which selects two game entities satisfying at least one criteria and in response the at least one processor is configured to provide a set of game entities comprising a number of game entities equal to the number of columns or the number of rows of the interaction area.

In some embodiments, the user interface may be configured to receive user input which selects two game entities satisfying at least one criteria and in response the at least one processor is configured to provide a set of game entities comprising a number of game entities equal to the number of columns or the number of rows of the interaction area, and which are controlled by the at least one processor to move from the game board area to the interaction area.

In some embodiments, the interaction area may comprise a plurality of different heights.

In some embodiments, one or more items may be provided to allow one or more game entities to navigate from one location at one height to another location at a different height.

In some embodiments, an interaction pattern for one or more game entities may be effective only for interaction entities located at a same height as the respective game entity.

In some embodiments, an interaction pattern for one or more game entities may be effective only for interaction entities located at a different height to the respective game entity.

In some embodiments, an interaction pattern for one or more game entities may be effective for interaction entities located at a same height and a different height as a respective game entity.

The at least one processor may be configured in response to a match condition to cause one or more shots to be provided in the interaction area.

The at least one processor may be configured to determine a characteristic of one or more shots dependent on a characteristic associated with the match.

In some embodiments, at least one processor may be configured to determine that an interaction entity is to be removed from the interaction area in dependence on the interaction entity being shot a predetermined number of times. The predetermined number of times may be one or more.

The predetermined number of times may be in a predetermined number of turns. The predetermined number of turns may be one or more.

In some embodiments, at least one processor may be configured to determine that an interaction entity is to be removed from the interaction area in dependence on the interaction entity being shot with one or more shots of a predetermined characteristic.

In some embodiments, the at least one processor may be configured to determine that one or more game elements is to be removed from the game board area in response to one or more events in the interaction area.

The one or more events may comprise the removal of a game entity from the interaction area and where the game entity satisfies one or more conditions. The one or more conditions may be that the game entity has unused interactions.

According to another aspect, there is provided a computer device configured to provide a computer implemented game, the computer device comprising: a display configured to display a game board area of the computer implemented game and an interaction area of the computer implemented game, the game board area comprising a plurality of game elements; a user interface configured to receive user input interacting with the game board area to make a move; and at least one processor configured to determine that one more match conditions have been satisfied by a plurality of game elements in the game board area and in response to provide one or more shots in the interaction area, the at least one processor being configured to determine an interaction of the one or more shots with one or interaction entities in the interaction area.

According to another aspect, there is provided a computer implemented method provided by a computer device configured to provide a computer implemented game, the method comprising: displaying by a display a game board area of the computer implemented game and an interaction area of the computer implemented game, the game board area comprising a plurality of game elements; receiving user input via a user interface interacting with the game board area to make a move; determining by at least one processor that one more match conditions have been satisfied by a plurality of game elements in the game board area and in response providing one or more game entities in the game board area; and controlling by the at least one processor one or more of the one or more game entities to move from the game board area to the interaction area.

The method may comprise controlling by the at least one processor one or more of the one or more game entities to move to a respective position in the interaction area in dependence on a location of the respective game entity in the game board area.

The game board area may comprise a plurality of rows and columns. The plurality of rows and column of the game board area may define positions for the plurality of game elements. The interaction area may comprise a plurality of rows and columns. The plurality of rows and columns of the interaction area may define positions for the game entities.

One of the rows and columns of the game board area may be aligned with corresponding ones of the rows and columns of the interaction area.

The method may comprise causing by the at least one processor the game entity to move from a respective column or row of the game board area to a respective corresponding column or row of the interaction area.

The interaction area may be a battle area.

The method may comprise causing by the at least one processor the one or more game entities moved from the first game board area to the interaction area to interact with one or more interaction entities provided in the interaction area.

The method may comprise receiving via the user interface a user input selecting a game entity and in response to that user input, causing by the at least one processor the selected game entity to move from the game board area to the interaction area.

The method may comprise causing by the at least one processor the selected game entity to move from a row or column of the game board area having the selected game entity to move to the corresponding row or column of the interaction area.

The method may comprise receiving via the user interface a user input selecting and moving a game entity and in response to that user input causing by the at least one processor the selected game entity to move from the game board area to the interaction area.

The method may comprise causing by the at least one processor the selected game entity to move from a row or column of the game board area having a position to which the selected game entity is moved by the user input and causing the selected game entity to move to the corresponding row or column of the interaction area.

The method may comprise providing by the at least one processor an interaction pattern for a respective game entity.

The interaction pattern may occupy a plurality of positions of the interaction area.

The method may comprise causing by the at least one processor the one or more game entities moved from the game board area to the interaction area to interact with one or more interaction entities located in a respective interaction pattern of the respective game entity.

The interaction may be to remove one or more interaction entities.

The interaction may be to reduce a health of one or more interaction entities.

The method may comprise receiving via the user interface a user input to select a game entity and causing by the at least one processor the display to highlight a path that would be taken by the game entity when moving to the interaction area.

The method may comprise receiving via the user interface a user input to select a game entity and in response causing by the at least one processor the display to highlight a path that would be taken by the game entity when moving to the interaction area and to highlight a respective interaction pattern associated with the game entity.

The method may comprise highlighting by the at least one processor of a position of one or more interaction entities with respect to the interaction pattern associated with the game entity.

The method may comprise highlighting by the at least one processor the path and/or the respective interaction pattern while user input received via the user interface is selecting the game entity.

The method may comprise highlighting by the at least one processor the path and/or the respective interaction while user input received via the user interface has selected and moved the game entity.

The method may comprise determining by the at least one processor a respective position in the interaction area for one or more game entities.

The method may comprise determining by the at least one processor a respective position in the interaction area for one or more game entities in dependence on the position of one or more interaction entities.

The method may comprise determining by the at least one processor a respective position in the interaction area for one or more game entities in dependence on the position of one or more other game entities.

The method may comprise determining by the at least one processor a position in the interaction area for a game entity in dependence on an interaction pattern of that game entity.

The method may comprise determining by the at least one processor a position in the interaction area for a game entity in dependence on an interaction pattern of that game entity and on respective positions of one or more interaction entities.

The method may comprise causing by the at least one processor a plurality of game entities to move to the interaction area and determining an order for the plurality of game entities in dependence on respective interaction patterns of the respective game entities.

The method may comprise determining by the at least one processor a number of game elements satisfying a match condition and in response selecting one of a plurality of different game entities to be provided.

The method may comprise determining by the at least one processor a matching characteristic of game elements satisfying a match condition and in response selecting one of a plurality of different game entities to be provided.

The method may comprise determining by the at least one processor that one or more match conditions have been satisfied in response to the user input selecting one or more game elements in the game board area to make a move.

The method may comprise determining by the at least one processor that one or more match conditions have been satisfied in response to a rearrangement and/or replenishment of the game board area.

The method may comprise receiving via the user interface a user input which results in the selection of two game entities and in response providing by the at least one processor one entity which differs in at least one respect to the selected two game entities.

The method may comprise receiving via the user interface a user input which results in the selection of two game entities and in response providing by the at least one processor one entity which differs in at least one respect to the selected two game entities and controlling the at least one processor to move from the game board area to the interaction area.

The one entity may differ from the selected two game entities in that the one entity may have a greater effect in the interaction area in at least one respect as compared to at least one of the selected two game entities.

The one entity may have an increased size as compared to the selected two game entities.

The method may comprise controlling by the at least one processor the one entity having an increased size as occupying a single position in the interaction area The user input which results in the selecting of two game entities may comprise moving one of the two game entities to a position of the other game entity.

The one entity may have at least one same characteristic as the game entity which is moved to the position of the other game entity.

The method may comprise receiving user input via the user interface which results in the selection of two game entities and in response providing by the at least one processor a set of game entities comprising at least three game entities.

The user input which results in the selecting of two game entities may comprise moving one of the two game entities to a position of the other game element.

The method may comprise receiving via the user interface an input which selects two game entities satisfying at least one criteria and in response providing by the at least one processor a set of game entities comprising a number of game entities equal to the number of columns or the number of rows of the interaction area.

The method may comprise receiving via the user interface an input which selects two game entities satisfying at least one criteria and in response providing by the at least one processor a set of game entities comprising a number of game entities equal to the number of columns or the number of rows of the interaction area, and controlling by the at least one processor the set of game entities to move from the game board area to the interaction area.

In some embodiments, the interaction area may comprise a plurality of different heights.

In some embodiments, one or more items may be provided to allow one or more game entities to navigate from one location at one height to another location at a different height.

In some embodiments, an interaction pattern for one or more game entities may be effective only for interaction entities located at a same height as a respective game entity.

In some embodiments, an interaction pattern for one or more game entities may be effective only for interaction entities located at a different height as a respective game entity.

In some embodiments, an interaction pattern for one or more game entities may be effective for interaction entities located at a same height and a different height as a respective game entity.

The method may comprise causing by the at least one processor in response to a match condition one or more shots to be provided in the interaction area.

The at least one processor may be configured to determine a characteristic of one or more shots dependent on a characteristic associated with the match.

The method may comprise determining by the at least one processor that an interaction entity is to be removed from the interaction area in dependence on the interaction entity being shot a predetermined number of times. The predetermined number of times may be one or more.

The predetermined number of times may be in a predetermined number of turns. The predetermined number of turns may be one or more.

The method may comprise determining by the at least one processor that an interaction entity is to be removed from the interaction area in dependence on the interaction entity being shot with one or more shots of a predetermined characteristic.

The method may comprise determining by the at least one processor that one or more game elements is to be removed from the game board area in response to one or more events in the interaction area.

The one or more events may comprise the removal of a game entity from the interaction area and where the game entity satisfies one or more conditions. The one or more conditions may be that the game entity has unused interactions.

According to another aspect, there is provided a non-transitory computer readable storage device storing instructions that, when executed by at least one processor of a computer device causes the at least one processor to provide any of the methods of embodiments.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

For a better understanding of some embodiments and to show how the same may be carried into effect, reference will now be made by way of example only to the accompanying drawings in which:

FIG. 5 shows a screen shot of a game board area and battle area of a computer implemented game of some embodiments;

FIG. 6a shows part of a screen shot showing a first match pattern to create a hero in the game board area of the computer implemented game;

FIG. 6b shows the hero in the game board area of the computer implemented game provided as a result of the match shown in FIG. 6a;

FIG. 7a shows a first example of an attack pattern of a hero;

FIG. 7b shows a second example of an attack pattern of a hero;

FIG. 8a shows a first example when one hero is combined with another hero to provide a larger hero;

FIG. 8b shows a second example when one hero is combined with another hero to provide a larger hero;

FIGS. 8c to 8e show screen shots of an example when one hero is combined with another hero to provide an army of heroes;

FIGS. 12a to 12c show screen shots of selection of a set of heroes to be used;

FIGS. 18a to 18d show a boss enemy mode of some embodiments; and

DESCRIPTION OF PREFERRED EMBODIMENTS

The terms user and player are used interchangeably throughout this document and no specific meaning is intended using one or the other unless the context suggests otherwise.

In the following description of various implementations of the embodiments, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the game is not exhaustive, what is described herein are certain preferred embodiments. It is possible to implement the way in a number of variations without departing from the scope of the invention as claimed.

Figure 4:
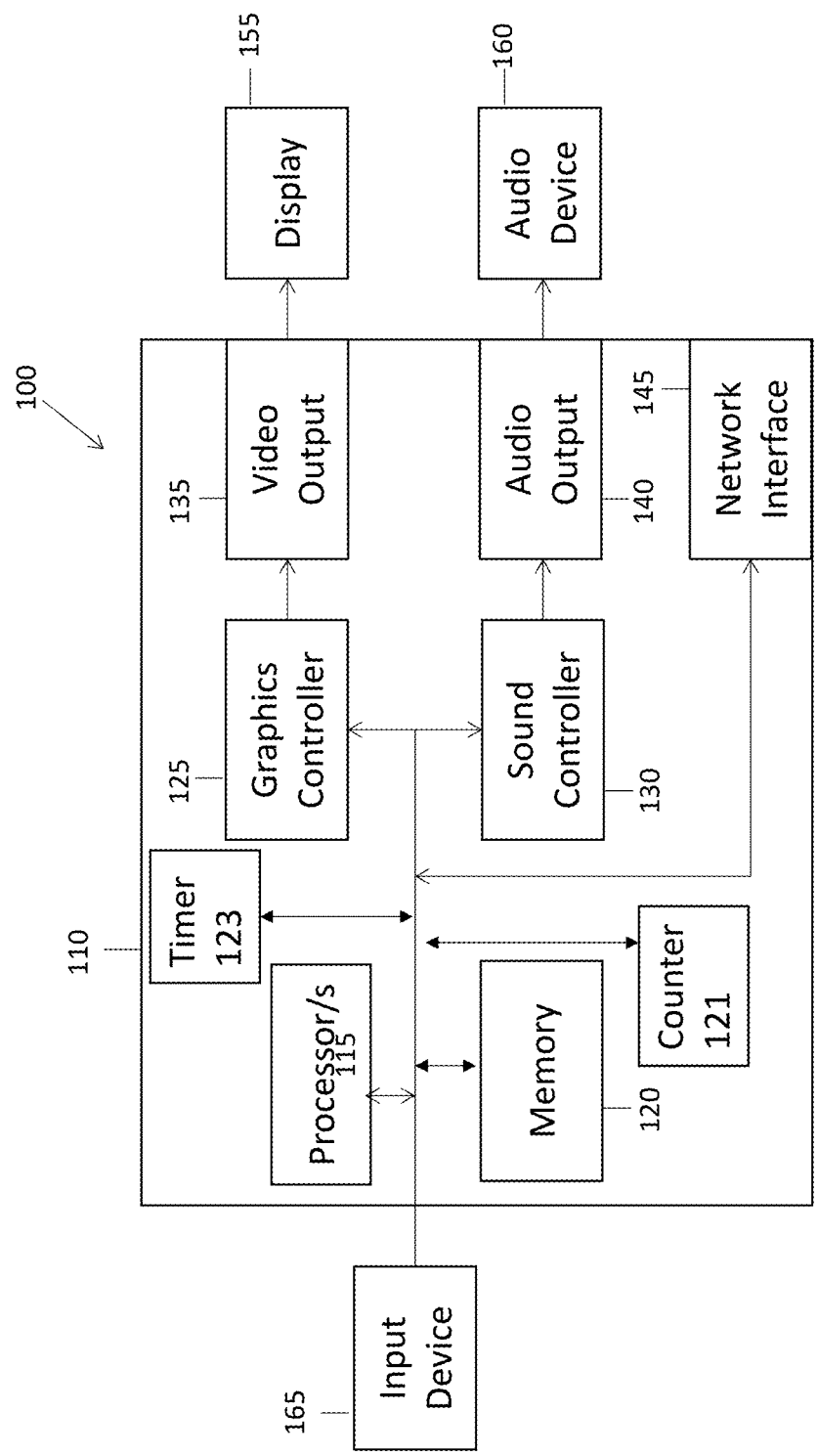
FIG. 4 shows an example user device in which some embodiments may be provided.

A schematic view of a user device 100 according to an embodiment is shown in FIG. 4. All of the blocks shown are implemented by suitable circuitry. The blocks may be implemented in hardware and/or software. The user device may have a control part 110.

The control part has at least one processor 115 and at least one memory 120

The control part 110 is shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device may have a counter or counter function 121. The counter function may be provided by hardware or software or by a combination of hardware and software.

The device may have a timer function 123. The timer function may be provided by hardware or software or by a combination of hardware and software.

The device 100 has an input device 165. The input device can take any suitable format and can be one or more of a keyboard, mouse, touch screen, joystick or game controller. It should be appreciated that the display 155 may in some embodiments alternatively or additionally provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 3:
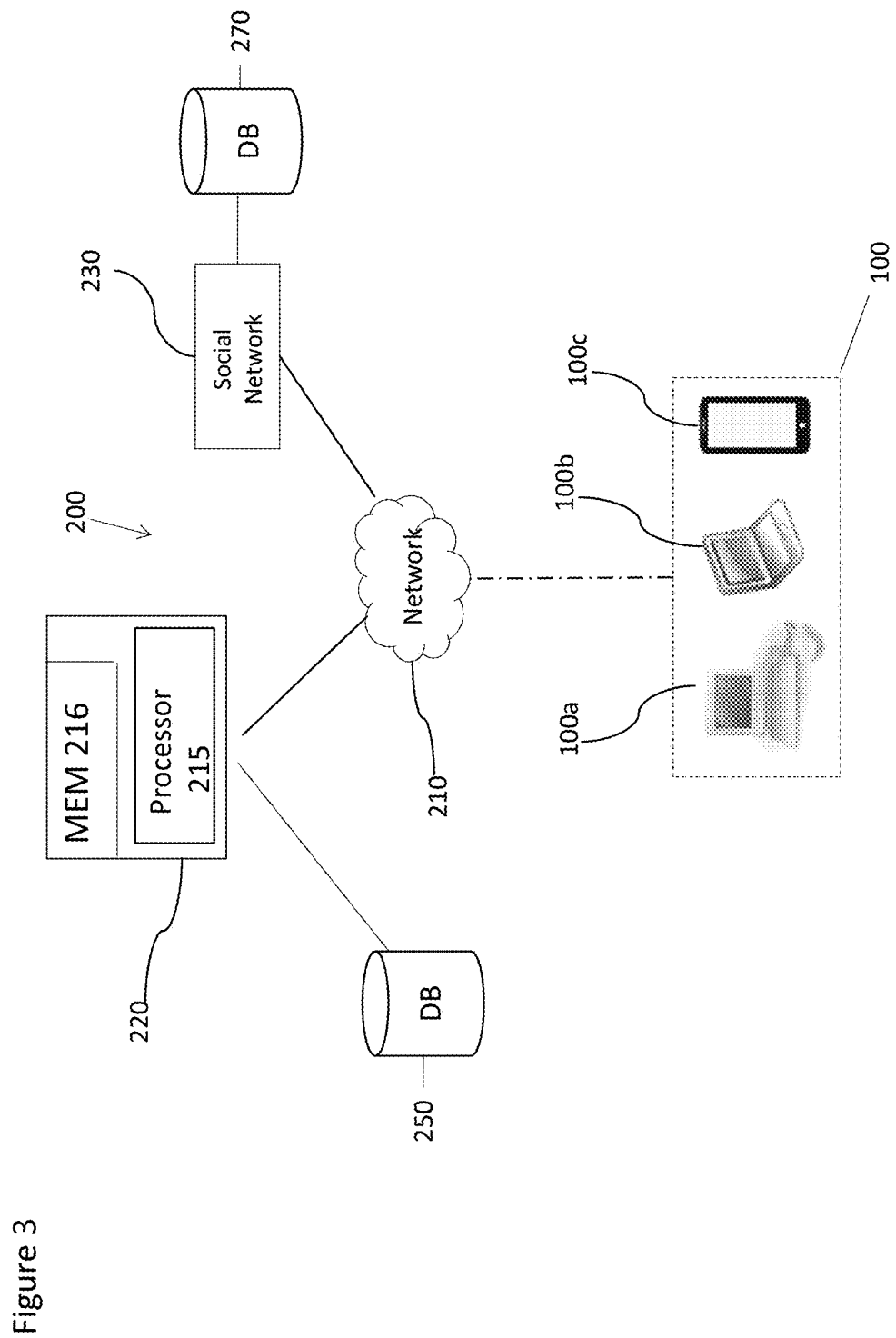
FIG. 3 shows an example system in which some embodiments may be provided.

FIG. 3 schematically shows a system 200 according to an embodiment. The system 200 comprises a server 220 which may store or be in communication with database 250. The database may store one or more of game player's details, profiles, statistics etc. In practice, one or more databases 250 may be provided. Where more than one server 220 is provided, the database(s) 250 may be provided in one database 250 or across two or more servers. The server 220 may also have a games data function. This may comprise one or more units of memory 216 to store the computer game program, user behaviour data and at least one processor 215 to run the games program and process the user behaviour data.

The server 220 may communicate via, for instance, the internet 210 to one or more client or user devices 100, such as shown in FIG. 4 by way of example, as user devices 100a, 100b and 100c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the at least one processor of the user device. However, the server 320 may handle some elements of the game in some embodiments. By way of example only, a Java game applet may be provided to the user device 200 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 1:
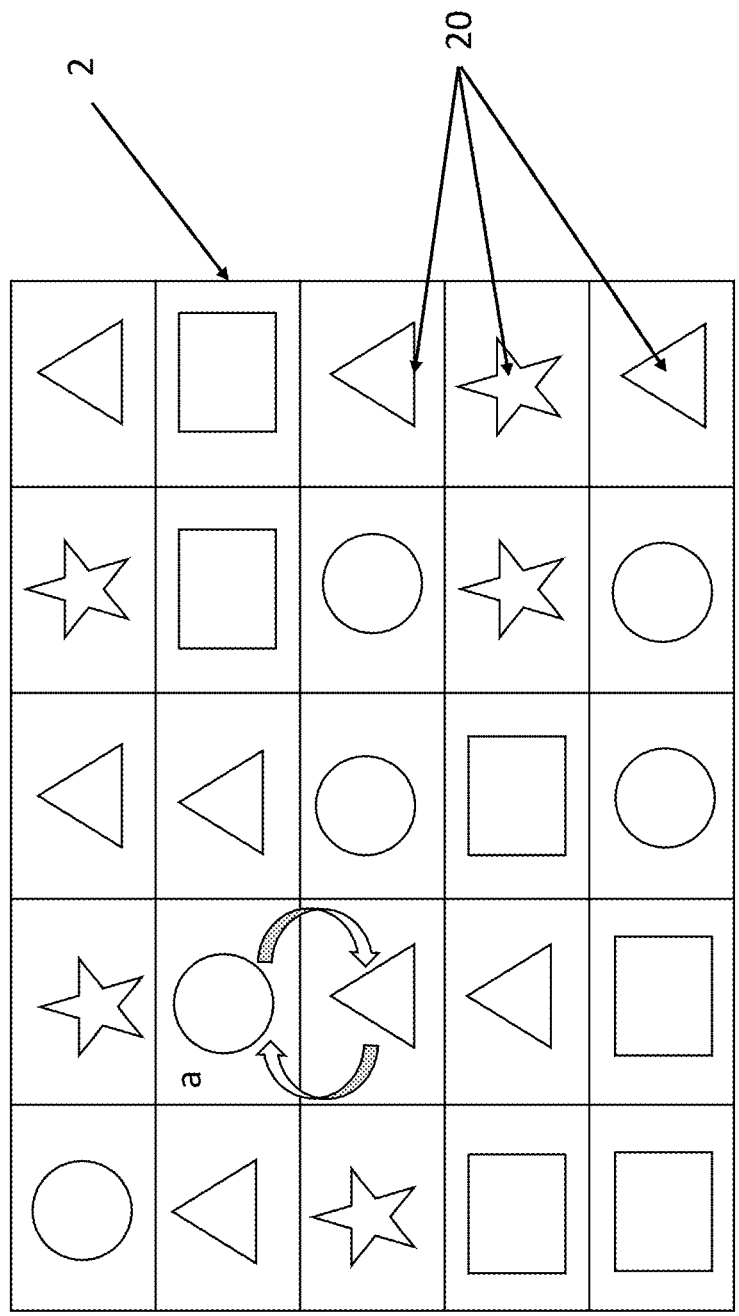
FIGS. 1 and 2 show schematic diagrams of a game board of a match game illustrating a matching mechanic used in some embodiments.

The switching mechanism of some embodiments will now be described with reference to FIGS. 1 and 2. FIG. 1 illustrates a game board area 2 with a plurality of game elements 20. The game board area and game elements are displayed on the display of a user device such as described in relation to FIG. 4. The display may be a touch screen. The game elements will be one of a plurality of different types. In the example shown, the game elements have different shapes. Alternatively or additionally the game elements may have a different visual appearance such as colour and/or pattern and/or picture.

The aim is to swap or switch game elements with each other to make moves in the game board area. The user may provide an input via the user interface to select and move a game element to an adjacent position. This will swap the selected game element with the game element in the adjacent position. To achieve game goals, the player has to make moves that create matches of at least three of the same game element, in some embodiments. The at least one processor is configured to determine if one or more matches satisfying one or more match conditions is satisfied.

The action which results from the determination of a match condition will depend on the number of game elements in the match and this will be described in more detail later. The at least one processor may be configured to determine that the matched game elements may be removed from the game board area. As a result, the at least one processor may be configured to cause new game elements to be provided and the existing game elements may move to fill the gaps caused by the removal of the matched game elements. In some embodiments, the game board area may be refilled with game elements from one or more given directions.

It should be appreciated that there is a technical challenge to create a computer implemented game which on the one hand has a relatively small game board area displayed on the display of the computer device but at the same time is engaging. The game board area is relatively small in order to allow the game to be played on a mobile phone or smart phone, in some embodiments.

Reference is made first to the move referenced a in FIG. 1. In the move, the user provides a user input via the user interface to select and move a triangle game element. The triangle game element is moved by the user input to swap or switch places with a circle game element in an adjacent game board area position. In the case of a touchscreen, the triangle game element may be selected by the user touching that game element and then dragging their finger to the position occupied by the circle game element. The selected triangle game element is dragged with the user's finger to the new position and the circle game element swaps or switches to the position previously occupied by the triangle.

Figure 2:
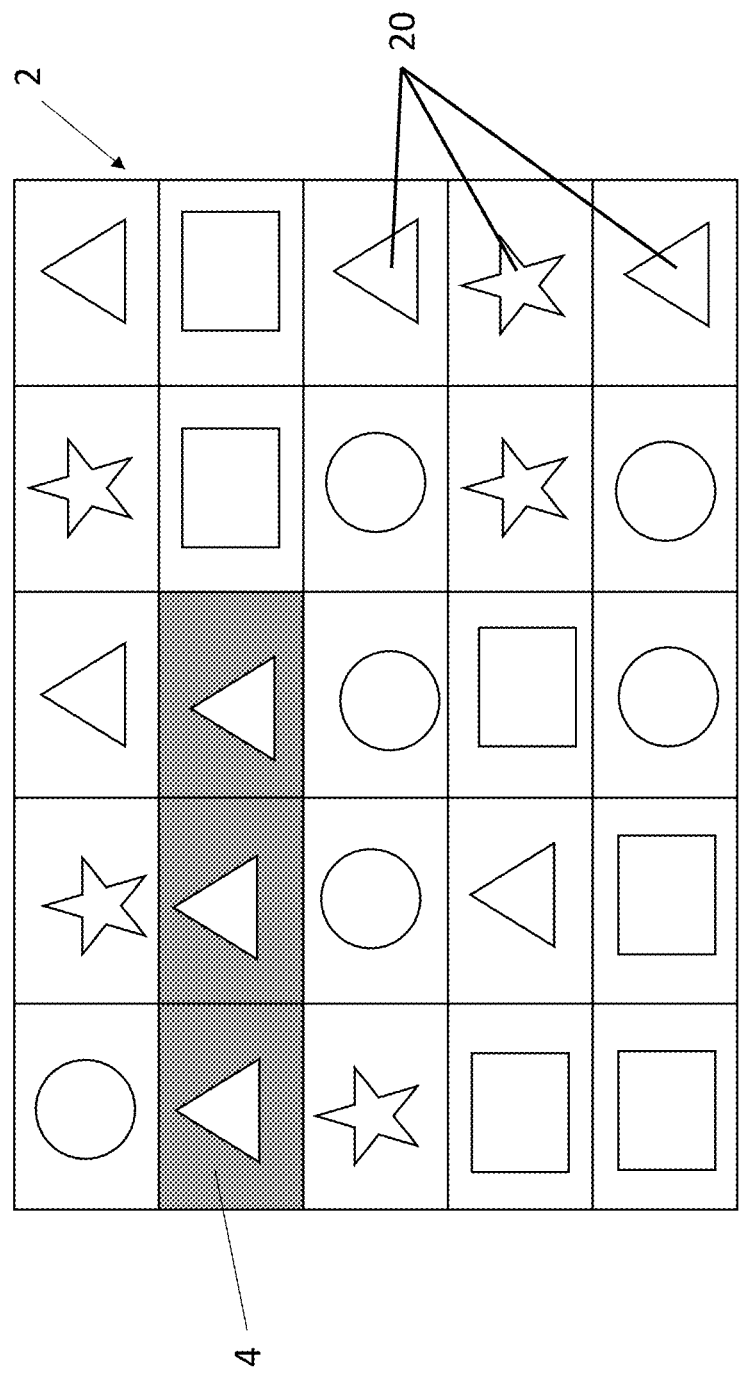

FIG. 2 shows the game board area provided by the at least one processor on the display after this move has been completed. As referenced by the highlighting 4 of the three triangles game elements in a row, a match has been made. In practice any suitable highlighting of the game elements of the match may be used. The highlighting of the matched game elements is optional in some embodiments. Thus the swapping of the triangle game element with the circle game element has provided a match of three triangle game elements. Thus, in some embodiments, the at least one processor is configured to cause those game elements which match to be displayed in a visually distinct manner. For example, those game elements which are in a match are highlighted.

The at least one processor may be configured to cause the game elements making up the one or more matches may be removed from the game board area. The at least one processor may be configured to cause the game board area to be replenished with new game elements. Removal of the matched game elements may result in further matches, those matched game elements also being removed. For example, when the matched game elements are removed, the game elements below the removed game elements move up to fill the space occupied by the removed game elements and new game elements will be added to fill up the game board area. The refilled game board area may have one or more matches. Those matching game elements are removed and the process is repeated until there is a game board area with no matches.

In some embodiments, there may be one or more game elements on the board which cannot be moved.

In some embodiments, the at least one processor may be configured to determine if the user input which selects and moves a game element is a valid move. The at least one processor may be configured to determine that a valid move has been made if there are three or more game elements which satisfy one or more criteria such as discussed later. If the at least one processor determines that a valid move has been made, the at least one processor is configured to allow the switch to be made and cause the matching game elements to be removed from the game board area.

If the at least one processor determines that the user input which selects and moves a game element is not a valid move, the at least one processor is configured to prevent the move from being made. For example, when the user input is released, the at least one processor is configured to move the selected game element back to its original position.

Reference is made to FIG. 5 which shows a game area 300 which is displayed on the display of a computer device. At least one processor of the user device is configured to cause the game area shown in FIG. 5 to be displayed on the display. The game area has a first part 302 which provides an interaction area and a second part 306 which provides a game board area. In the following, the interaction area is referred to as battle area but it should be appreciated that this only one example of the interaction area.

In some embodiments, the user is unable to directly control an entity in the interaction area. Rather, the user is only able to interact with game entities and the game elements provided in the game board area. For example the user input received via the user interface may select and move a game entity or game element only when that game entity or game element is in the game board area. These game entities may be or so-called heroes which are created during game play. The created game entities will be referred to as heroes in this document.

Interactions by the user with the game board area can be used to control the game entities in the interaction area. The interactions may be a user input received via the user interface to select and move a game element or hero. For example, the user input may be used by the at least one processor to control where a hero moves in the interaction area. That user input may for example be associated with that hero when the hero is in the game board area.

The game board area 306 comprises game elements such as described in relation to FIGS. 1 and 2. In this example, the game elements are arranged in rows and columns on a game board of the game board area. There are 9 rows and 9 columns in the game board. However in different embodiments, the numbers of rows and columns may be different. The number of rows may be equal to the number of columns or the number of rows may be different to the number of columns.

In some embodiments, the user is able to make a move by providing a user input to select one of the game elements and switch that selected game element with another game element. The user interface will receiver user input which selects the game element and causes the game element to move. This user input may comprise the user touching the selected game element on a touch screen of the user device and dragging the game element to a switched position. In other embodiments, the movement may be controlled by a pointer device such as mouse or the like.

The at least one processor is configured to determine based on the user input received via the user interface what move has been made by the user. The at least one processor is configured to cause the display to display the move made by the user input. The at least one processor is configured to determine if the move made by the user has cause a match to be made. If the at least one processor determines that a match has been made, the at least one processor is configured to cause the matched game elements to be removed and to cause an updated game board area to be displayed.

In some embodiments, the game may have a limited number of moves in which the player aims to complete the goal of that game. The at least one processor may be configured to determine the number of moves made by the user. In some embodiments, the at least one processor is configured to update the counter each time a move is made. The counter may be a counter function provided by a computer program and/or may be a hardware counter. The counter function may be a count up or a countdown counter.

In some embodiments, the remaining moves 308 may be displayed on the display. In some embodiments, the number of moves used up may alternatively or additionally be displayed.

The battle area comprises a grid arrangement 304. In some embodiments the grid is made up of grid locations arranged in rows and columns. In some embodiments, there may be a one to one relationship between the columns of the battle area and the columns of the game board in the game board area. For example if there are 9 columns in the game board area, there are 9 columns in the battle area.

In some embodiments the number of rows in the grid arrangement may be the same as the number of rows in the game area. In other embodiments, the number of rows in the battle area may be different to the number of rows in the game board area.

One or more battle entities are provided in the battle area. These battle entities may be regarded as enemies. One aim of some embodiments is for the player to defeat one or more of these enemies. This may be achieved as a result of the moves made by the player in the game board area. The battle entities are controlled by the at least one processor. The battle entities may be static or move in the battle area.

In some embodiments, the battle area may be provided with one or more obstacles. An obstacle may be fixed or may be removable.

In some embodiments, the at least one processor is configured to control the one or more enemies. The at least one processor may be configured for example to control how the one or more enemies moves.

In some embodiments, during a turn resulting from a move made by the player interacting with the game board area, a game entity or hero is created. The at least one processor is configured to determine that one or more criteria have been satisfied and in response to provide in the game board area the created game entity. The created game entity may be deployed in the battle area. This may be in response to input provided by the user via the user interface and/or in response to game play resulting from an input provided by the user via the user interface. In some embodiments, the at least one processor is configured to determine that the game entity is to be deployed in the battle area. The at least one processor may be configured to determine how the entity is to be deployed in the battle area.

Some different examples of how a hero can be created in the game board area will be described later.

In some embodiments, once a hero has been created, the hero may move from the game board area to the battle area. In some embodiments, the hero may be created in one turn and may be triggered to move to the battle area in another turn. In other embodiments, a hero may be created and triggered to move to the battle area in the same turn. This will be described in more detail later. It should be appreciated that the user is only able to provide user input to directly interact with hero when the hero is in the game board area. This may control where the hero moves to in the interaction area. In some embodiments, the user is not able to provide user input to directly engage or select the hero when the hero is in the interaction area.

In some embodiments, a turn is where a move is made by the user input received via the user interface. This may be to select and move a game element to make a match or to select and move a hero to deploy the hero. Actions in the game board area and/or battle area may directly and/or indirectly result from the move made by the user and a turn is completed when the actions have been completed. For example, a turn may be completed when the game board area contains no matches. The at least one processor may be configured to determine when a turn is completed. The at least one processor may be configured to prevent the user from making the next move until the current turn is completed.

In some embodiments, the at least one processor is configured to determine that a hero is triggered or to be deployed. When the at least one processor has determined that the hero is to be deployed, the at least one processor is configured to cause the hero to move up the column in which it is located in the game board area and move onto the battle area. The at least one processor is configured to cause the display to display the movement of the game entity.

The at least one processor is configured to cause the hero to be moved to the battle area. The at least one processor is configured to determine a position for hero in the battle area. The hero will be moved in the battle area until the determined position has been reached. The at least one processor is configured to cause the display to hero moving from the game area to the battle area. The at least one processor is configured to determine the position for the at least one hero based on or more factors. The determined position may depend on the position of one or more obstacles in the battle area and/or the position of one or more enemies in the battle area and/or the position of one or more other heroes and/or the characteristics of one or more of the heroes being moved at the same time us the current hero and/or an attack pattern of the hero.

For example, in some embodiments, a position of a hero is determined such that contact with an enemy is made by the attack pattern of the hero. At least some of the heroes are such that they have an associated area of effect which is defined as a set of grid locations relative to the current location of the hero. This area of effect may be referred to as an attack pattern.

Two examples of attack patterns will now be described in relation to FIGS. 7a and 7b.

FIG. 7a shows an attack pattern which is referred to a melee attack pattern. When the hero 700 is located in the battle area, the hero is located on a grid element 702. The hero is able to hit, for example an enemy, located in any of 8 grid locations 704 surrounding the central grid elements. Thus the at least one processor will determine that an enemy located in any of the eight grid locations is attacked by the hero.

In some embodiments, the at least one processor may determine that there are two or more enemies in the grid of the attack pattern. The at least one processor may be configured to determine which one or more or if all of the enemies located in the attack pattern are to be attacked in one turn. In some embodiments, one or more different enemies may be attacked in different turns, provided they are still located in the attack pattern.

These eight locations are the grid locations which are above, below, left and right of the grid location 702 along with the locations in the diagonal directions of up and left, up and right, down and left, and down and right. The melee pattern provides a 3×3 area with the hero located in the central location of the 3×3 area.

FIG. 7b shows an attack pattern which is referred to a ranged attack pattern. When the hero 710 is located in the battle area, the hero is located on a grid element 712. The hero is able to attack, for example an enemy, located in any of the following 8 squares 714: two grid elements to the left of grid element 712, two grid elements to the right of grid element 712, two grid elements above the grid element 712, and two grid elements below the grid element 712. Thus the at least one processor will determine that an enemy located in any of the eight grid locations is attacked by the hero. In this example, not all of the grid elements of the attack pattern are directly adjacent the grid location 712 of the hero.

It should be appreciated that in some embodiments, there may be more or less than two attack patterns. Alternative or additional attack patterns may be provided in some embodiments.

An attack pattern may comprise one or more grid elements. Different attack patterns may have more or less than the eight grid elements of the above described examples.

In some embodiments, an attack pattern may not be provided in grid locations adjacent the hero. Some heroes may have a long range attack patterns.

In some embodiments, as discussed later, a three dimension interaction may be provided. In some embodiments, an attack pattern may only be effective at a given height with respect to the height of the hero. The height of the attack pattern may be the same or different to the height at which the hero is located.

In some embodiments, the attack pattern of a hero may be effective at two or more heights. One of those heights may be that at which the hero is located. In some embodiments, the two or more heights of the attack pattern may be different to that at which the hero is located.

A grid element of an attack pattern may be associated a single height. In some embodiments, a grid element of an attack pattern may be associated with two or more heights. In some embodiments, the at least one processor is configured to cause the heroes to run up in their column in the game board area, continue to move in the column of the battle grid and stop the hero at a location where an enemy in located in on a grid location of the attack pattern.

In some embodiments, the at least one processor is configured to determine a stop location for the hero. This is the location in the battle area to which the hero is moved when deployed. The stop location will be in the column of the battle area corresponding to that of the game board in which the hero is located.

In some embodiments, the at least one processor may be configured to determine for a first candidate location in the column of the battle area if there is an obstacle or enemy in next grid location of the same column. If so, the at least one processor is configured to determine this as the stop location for the hero in the battle area.

If not, the at least one processor may determine if there are any enemies in the attack pattern of the hero if the hero is at that candidate position. If there is, the at least one processor is configured to determine this candidate location as the stop location.

If it is determined that there is no enemy within the attack pattern, then the at least one processor is configured to cause the next location in the column in the battle area to be considered as a candidate location and the method is repeated.

If no location is found for the hero, then the at least one processor is configured to cause the hero to be removed from the game board area.

In some embodiments, the at least one processor may be configured to determine the furthest candidate location a hero would be able to move in the interaction area without being stopped by an obstacle or enemy in the same column. The at least one processor may determine if there are any enemies in the attack pattern of the hero if the hero were to be at that furthest candidate position. If there is, the at least one processor is configured to determine that furthest position as the stop position to which the hero will move in the battle area when deployed.

If it is determined that there is no enemy within the attack pattern if the hero were to be at that furthest candidate position, then the at least one processor is configured to cause the next location in the column of the battle area, closer to the game board area to be selected as a next candidate location and the method is repeated.

When a candidate location is selected as the stop position, the at least one processor is configured to cause the hero to move to that stop position when user input to deploy the hero is received.

If no location is found for the hero in the column of the battle area corresponding the column of the game board in which the hero is located, then the at least one processor is configured to cause the hero to be removed from the game board area.

In some embodiments, an obstacle or enemy located in the column may prevent the hero from initially moving beyond the grid position of the enemy or obstacle.

In some embodiments, the at least one processor is configured to determine the location of any obstacles in a column and any locations in the column which allow the hero to have one or more enemies located in their attack pattern.

The at least one processor may use the determined locations and any suitable criteria to determine which grid location or stop location for the hero. The at least one processor may be configured to cause the hero to be moved to the determined grid location in response to user input. The criteria may take into account one or more of other heroes moving into the same column of the battle area in the same turn and/or other heroes already in the same column of the battle area and/or the attack pattern of the hero and/or the attack pattern of one or more other heroes and/or the number of enemies and/or the types of enemies.

In some embodiments, a candidate stop location is selected in dependence on a given enemy being located within an attack pattern of the hero if located at that candidate stop location. In some embodiments, depending on the attack pattern, there may be more than one stop location in the column of the battle area in which the hero could be located and the at least one enemy would still be in the attack pattern of the hero. In some embodiments, the candidate stop position may be adjusted such that the adjusted candidate stop position may be the furthest position in the column of the battle area such that if the hero is located at the adjusted candidate stop position, the enemy is still within the attack pattern of that hero.

In some embodiments, the hero has an ability with an area of effect in the battle area. This will impact a set of grid locations relative to the hero position. In some embodiments, this may allow the player to strategize as to how to best position the heroes to attack the one or more enemies and/or achieve one or more objectives.

In some embodiments, the at least one processor is configured to provide a hero in response to determining the occurrence of a match satisfying a given criteria occurring in the game board area. This may be as a result of a move being made by the user directly or indirectly. For example the user provide user input to switch two game elements to a cause a match to be made. Alternatively, in response to removal one or more game elements, the position of one or more game elements may be changed and the game board area may be refilled with one or more game elements. This may result in a match which causes a hero to be made.

In some embodiments, the created hero may share one or characteristics with the matched game elements. For example, where different ones of the game elements have different colours and a match is made with game elements of the same colour, the appearance of the resulting hero will reflect that colour. The type of hero provided may in some embodiments depend on the colour and/or one or more characteristics of the game elements such as shape.

In some embodiments, when a match of three game elements is made, the at least one processor is configured to cause those game elements to be removed. In some embodiments, this will not cause a hero to be created. In other embodiments, the matching of three game elements will cause a hero to be created.

In some embodiments, the at least one processor is configured to determine when a match of four or more game elements has been made. In response to determining that a match of four or more game elements has been made, the at least one processor is configured to cause those game elements to be removed from the game board area and a hero to be provided. The at least one processor may be configured to cause the hero to be provided in the game board area.

When four game elements are matched, this will result in the creation of a hero. This hero may be of a first level or class. The match may be of four game elements in a row or column or four game elements arranged in a square. In some embodiments, a match may be considered to be made when there four game elements in a diagonal line.

In some embodiments, when a match is made with five game elements arranged in an "L" or "T" shape, then this will result in the creation of a hero. This hero may be of a second level or class. The second level may be a higher level that the first level such a hero at the second level is regarded as being stronger or more powerful than a hero of the first level. The hero at a second level may have a higher health and/or a higher attack strength and/or more attacks than a hero at the first level.

In some embodiments, when a match is made with five game elements arranged in line, then this will result in the creation of a hero. This hero may be of a third level or class. The third level may be a higher level that the first level and the second level such a hero at the third level is regarded as being stronger or more powerful than a hero of the first level or the second level. The hero at a third level may have a higher health and/or a higher attack strength and/or more attacks than a hero at the first level or the second level.

In some embodiments, different heroes may be created resulting from the satisfying of different match conditions and the characteristics of the matching game elements.

In this regard, reference is made to FIGS. 6a and 6b which show part of the game board 306. In FIG. 6a, a game element 310 is shown. This game element 310 is selected by user input received via the user interface and is switched with the game element 313 which is immediately above the selected game element. The at least one processor is configured to cause the switched game element 310 to move into a position such that a match is made with three other game elements 311. The switched game element 310 shares the same characteristic as the three other game elements.

As shown in FIG. 6b, the at least one processor is configured to cause the matching game elements to be removed from the game board area and a hero 312 to be provided in the game board area. In some embodiments the at least one processor is configured to determine the position of the hero 312 dependent on the position of the match. In some embodiments, the position of the hero 312 is the switched position of the game element which is switched to make the match.

In the example shown in FIG. 6a, the game elements 311 and 310 are green. Accordingly, the hero created and shown in FIG. 6b may share that green characteristic. In some embodiments, the hero created may depend on the characteristic of the matching game elements.

Likewise for the matches with five game elements, the hero may share and/or be dependent on the characteristic of the matching game element and be located at the switched position of the game element which is switched to make the match.

Figure 6C:
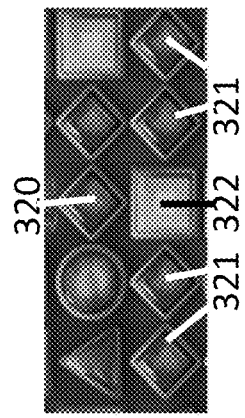
FIG. 6c shows part of a screen shot showing a second match pattern to create a hero in the game board area of the computer implemented game.
Figure 6D:
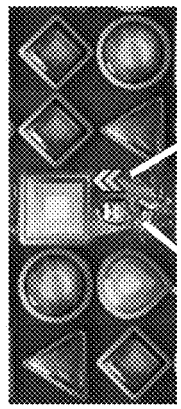
FIG. 6d shows the hero in the game board area of the computer implemented game provided as a result of the match shown in FIG. 6c.

Reference is made to FIGS. 6c and 6d which show part of the game board area 306. In FIG. 6c, a game element 316 is shown. This game element 316 is selected by user input received via the user interface and is switched with the game element 315 which is immediately below the selected game element. This causes the switched game element 316 to move into a position such that a match is made with four other game elements 314 arranged in an "L" shape. Thus two of four other game elements are in the same row as the switched game element 316 and the remaining two game elements are in the same column as the switched game element. The switched game element 316 shares the same characteristic as the four other game elements 314.

As shown in FIG. 6d, the at least one processor is configured to cause the matching game elements to be removed from the game board area and a hero 317 to be provided in the game board area. The position of the hero 317 is the switched position of the game element which is switched to make the match. In the example shown in FIG. 6c, the matched game elements are red. Accordingly, the hero created and shown in FIG. 6d may share and/or be dependent on that red characteristic.

Figure 6E:
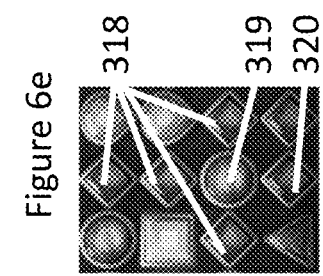
FIG. 6e shows part of a screen shot showing a third match pattern to create a hero in the game board area of the computer implemented game.
Figure 6F:
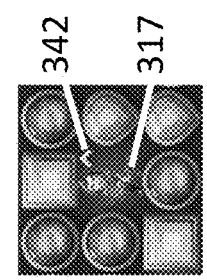
FIG. 6f shows the hero in the game board area of the computer implemented game provided as a result of the match shown in FIG. 6e.

Reference is made to FIGS. 6e and 6f which show part of the game board area 306. In FIG. 6e, a game element 320 is shown. This game element 320 is selected by user input received via the user interface and is switched with the game element 319 which is immediately above the selected game element. This causes the switched game element 320 to move into a position such that a match is made with four other game elements 318 arranged in a "T" shape. Thus two of four other game element are in the same row as the switched game element 320, one on either side of the switched game element and the remaining two game elements are in the same column as the switched game element. The switched game element 320 shares the same characteristic as the four other game elements 318.

As shown in FIG. 6f, the at least one processor is configured to cause the matching game elements to be removed from the game board area and a hero 317 to be provided in the game board area. The position of the hero 317 is the switched position of the game element which is switched to make the match. In the example shown in FIG. 6e, the matched game elements are red. Accordingly, the hero created and shown in FIG. 6f may share and/or be dependent on that red characteristic.

Figure 6G:
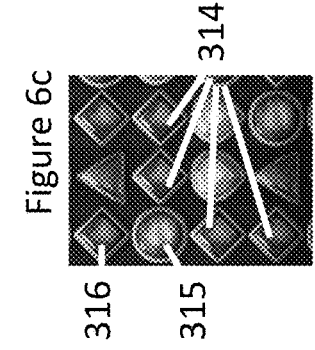
FIG. 6g shows part of a screen shot showing a fourth match pattern to create a hero in the game board area of the computer implemented game.
Figure 6H:
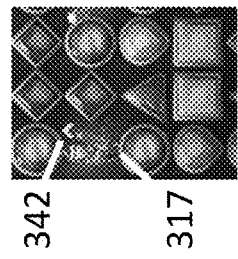
FIG. 6h shows the hero in the game board area of the computer implemented game provided as a result of the match shown in FIG. 6g.

Reference is made to FIGS. 6g and 6h which show part of the game board area 306. In FIG. 6g, a game element 320 is shown. This game element 320 is selected by user input received via the user interface and is switched with the game element 322 which is immediately below the selected game element. This causes the switched game element 320 to move into a position such that a match is made with four other game elements 321. The switched game element 320 shares the same characteristic as the four other game elements.

As shown in FIG. 6h, the at least one processor is configured to cause the matching game elements to be removed from the game board area and a hero 324 to be provided in the game board area. The position of the hero 324 is the switched position of the game element which is switched to make the match. In the example shown in FIG. 6g, the matched game elements are red. Accordingly, the hero created and shown in FIG. 6h may share and/or be dependent on that red characteristic.

In some embodiments, one or visual indications may be used to indicate to a player a level or class associated with a hero. For example, a hero of the first level may have no "sergeant stripes", a hero of the second level or class may have one "sergeant stripe" 342 (which can be seen in FIGS. 6d and f) and a hero of the third level or class may have two "sergeant stripes" 340 (which can be seen in FIGS. 6g and h). It should be appreciated that this is by way of example only and any other suitable visual indicators may be used. In some embodiments, the heroes provided at two or more of the different levels or classes may have the same representation along with the visual distinction to differentiate the levels or classes. In other embodiments, the heroes of the different levels or classes may be visually distinct.

It should be appreciated that more or less than three hero levels may be provided. In some embodiments, there may be a single hero level associated with a given game board area.

In some embodiments, when a hero is created, it replaces one of the game elements of the match. The other game elements are removed and the game board is rearranged and replenished.

In other embodiments, when a match is made, the game elements of the match are removed, the game board is rearranged and replenished and the hero which is created is added to the game board, The at least one processor may be configured to add the hero to the game board area at a position depending on the location of one or more of the matching game elements.

In some embodiments, if two heroes are located next to one another in the game board area, the position of one hero can be switched with the position of another hero.

In some embodiments, the at least one processor is configured to use the level or class of one or more of the heroes to determine the action resulting from the switching of one hero with another.

In some embodiments the at least one processor is configured to determine the level or class of each hero and in response to determine the action.

In some embodiments, the at least one processor is configured to determine that one of the heroes is at level one.

If one or two of the heroes are at the first level, the at least one processor is configured to cause a single larger sized hero to be created or provided. The larger sized hero will replace both of the switched heroes. Thus one of the heroes is at level 1 and the other hero is at level 1, 2 or 3.

It should be appreciated that the larger version of the hero is considered by the at least one processor to occupy a single position in the game board area and/or a single grid position in the battle area and is accordingly controlled.

In some embodiments, the larger hero may occupy more than one grid position and accordingly is controlled. The larger hero may have additional constraints when determining the position of the larger hero on the battle area.

Reference is made to FIG. 8a which shows a hero 800 next to another hero 802 in the same row. In this example, the user input received via the user interface is to select hero 800 and move it to the position of the other hero 802 as shown by the arrow. The user input swipes left from the position of the hero 800 to the position of hero 802. The at least one processor is configured to determine which hero has been selected and to provide a larger version 804 of the selected hero 800 at the position of the other hero 802. The at least one processor is configured to remove the other hero from the game board area. The at least one processor is configured to cause the larger version 804 of the hero to move into the battle area. The larger hero may be moved into the battle area such as previously described.

Thus the user is able to control which column of the two columns the larger hero is provided and/or the skill set of the larger hero based on which of the two smaller heroes is selected.

Reference is made to FIG. 8b which shows a hero 808 below another hero 806 in the same column. In this example, the user input received via the user interface is to select hero 808 and move it to the position of the other hero 806 as shown by the arrow. The user input swipes up from the position of the hero 808 to the position of hero 806. The at least one processor is configured to determine which hero has been selected and to provide a larger version 810 of the hero 808 at the position of the other hero 810. The at least one processor is configured to remove the other hero from the game board area. The at least one processor is configured to cause the larger version 810 of the hero to move into the battle area. The larger hero may be moved into the battle area, such as previously described Thus the user is able to control the skill set of the larger hero based on which of the two smaller heroes is selected.

In some embodiments, a larger hero may be able to inflict more damage than the two individual heroes.

In some embodiments, a larger hero may be able to inflict different damage as compared to the two individual heroes.

In some embodiments, a larger hero may be able to inflict more damage than one individual hero but less than two individual heroes.

In some embodiments, the larger hero may have a merged attack pattern with the attack pattern of both of the individual heroes.

The larger hero may have the same number of turns to attack as the normal sized heroes. In other embodiments, a larger hero may have more turns to attack than a normal sized hero.

A larger hero may have more health that the combined health of the two individual heroes.

A larger hero may have the same health as the combined health of the two individual heroes.

A larger hero may have more health that the one individual heroes but not as much as two individual heroes.

The ability of the larger hero may be the same as that of the hero which is selected and moved to switch with the other hero.

The ability of the larger hero may be different to that of the hero which is selected and moved to switch with the other hero.

In some embodiments, if the larger hero is created from a hero of the second or the third level, regardless of which hero is switched, the at least one processor is configured to provide the larger hero at the respective second or third level.

In some embodiments, the larger hero will follow the same rules as the corresponding smaller hero.

In some embodiments, a hero created from two heroes will be automatically deployed onto the game board area once the user has released the selected one of the two heroes in the switched position. The hero created from the two heroes will be deployed in the column having the switched position of the selected hero. In other embodiments, that larger hero will only be deployed when selected by user input received via the user interface.

In some embodiments, if both of the heroes are at a higher level (levels 2 and/or level 3), then the at least one processor is configured to provide an army of heroes.

The at least one processor may be configured to determine the level of each of the heroes. In some embodiments, the at least one processor may be configured to determine that both of the heroes are enhanced or have sergeant stripes.

The army of heroes comprises a plurality of heroes. The number of heroes in the army may depend on the level of the two heroes.

The heroes in the army may all be the same and depend on which one of the heroes is selected for switching.

If both heroes are level 2, then the at least one processor is configured to determine that the army will comprise 5 heroes.

If one hero is level 2 and the one hero is level 3, then the at least one processor is configured to determine that the army will comprise 7 heroes.

If both heroes are level 3, then the at least one processor is configured to determine that the army will comprise 9 heroes.

In some embodiments, the at least one processor is configured to cause all of the heroes in the army to be provided in different columns of the game board area. In other embodiments, one or more of the heroes of the army may be in the same column.

The at least one processor is configured to cause the army to include the hero selected by the user input and at the switched position for the selected hero. The switched position is the position to which the selected hero is moved as a result of the user input.

It should be appreciated that the sizes of the armies are by way of example only. In some embodiments, the largest army will comprise the same number of heroes as there are columns.

In some embodiments, the at least one processor is configured to cause the army to be created on each side of the column containing the switched position of the selected level 2 or level 3 hero. The at least one processor is configured to cause the number of heroes on each side of that column containing the switched position to be even where possible. However if the column contain the switched position is located at the edge or close to the edge of the game board area, then the at least one processor is configured to determine that the number of heroes on each side of that column will be different.

Reference is made to FIGS. 8c to 8e. As shown in FIG. 8c a level 2 hero 820 is next to a level 3 hero 822. In response to user input the level 3 hero is selected and moved to the position of the level 2 hero.

As shown in FIG. 8d, the at least one processor is configured to cause an army of heroes 824 to be provided in the game board area. In this example, the army comprises 7 heroes. The army comprises the selected level 3 hero 822 located in the column and position of the level 2 hero and 6 other heroes. Each hero is located in a different column.

FIG. 8e shows the army of heroes 824 which have been deployed in the battle area. As can be seen, the at least one processors is configured to cause each one of the army of heroes to be located in a different column of the battle grid.

In some embodiments, the army of heroes may be deployed in the interaction area without being deployed in the game board area.

In some embodiments, the army of heroes may be provided in the same row of the game board.

In some embodiments, each of the heroes is associated with a characteristic which is shared with one or more game elements. By way of example this characteristic may be colour. The characteristic of the hero which is selected and switched with the other hero is used to determine the position of the army of heroes in the game board. In particular for a column which is to have one of the army of heroes, the hero will be positioned at the location of a game element having the same characteristic of the selected hero. The game element with the shared characteristic is replaced by the army hero. Where there is more than one game element with the shared characteristic in the same column, any suitable criteria can be used to select the game element which is to be replaced by the army hero. For example, the game element selected may be the game element closest to the battle area, the game element closest to the moved position of the selected hero, the game element furthest from the battle area, the game element furthest from the moved position of the selected hero or at random.

In some embodiments, once a hero is created as a result of matching of game elements, that hero remains in the game board area until the player is ready to deploy the hero in the battle area. This may be the case for all or only some types of hero.

In some embodiments, deploying of another hero located in the same column as another hero may cause that another hero to be deployed.

In some embodiments, a hero is deployed as soon as it has been created. This may be the case for all or only some types of hero.

Figure 9B:
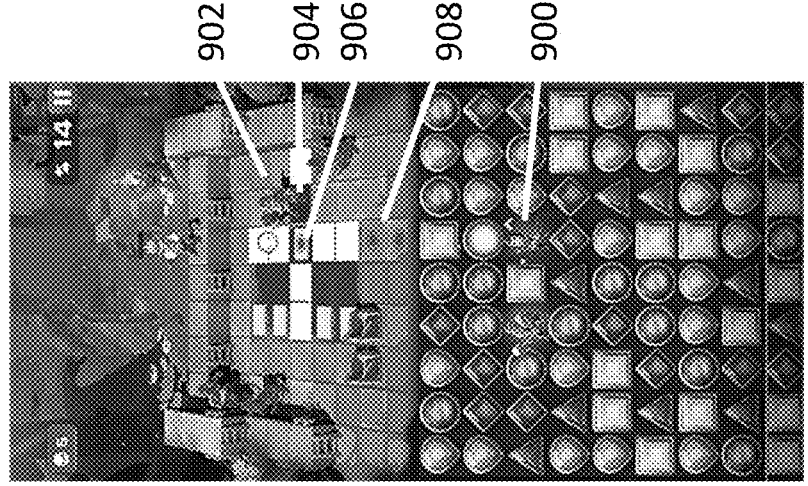
FIGS. 9a and 9b show screen shots of the selection of a hero prior to deployment in the battle area.
Figure 9A:
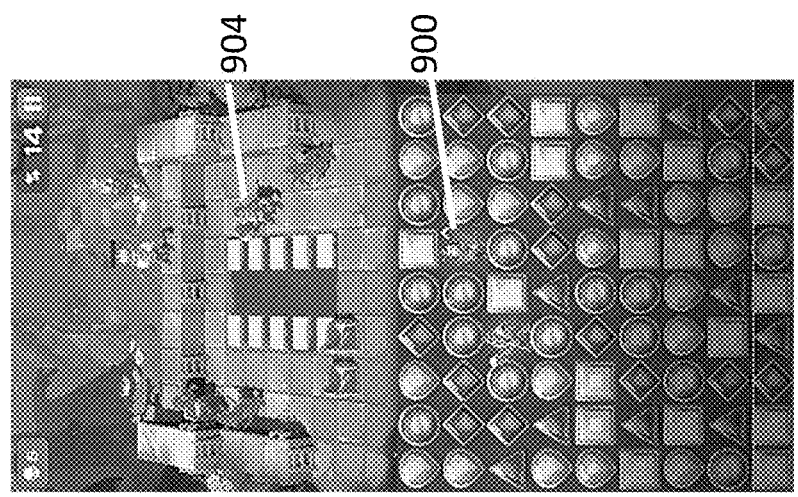

Reference is made to FIGS. 9a and 9b. In FIG. 9a, a hero 900 has been created and is located at in a game board position in a column. An enemy 904 is shown in the battle area. The enemy 904 is located on a grid element in a grid column which is aligned with the game board column adjacent to that in which the hero is located.

As shown in FIG. 9b, user input to select a hero is received via the user input. The user input will select and drag the hero to a location in the game board area above, below, to the right or to the left of the current location in the game board area. In some embodiments, the user input may only move the hero by one position. Thus the hero cannot be moved by more than one column or by more than one row. In other embodiments, the hero may be moved by more than one column or row in a move to deploy that hero.

In the example shown in FIG. 9b, the hero has been selected and dragged to the game board location below the current location of the hero.

In some embodiments, the at least one processor may be configured to determine that a move has been made when the hero is selected by the user input, dragged to a switched location and the user input to select the hero has been released when that hero is located at the switched location.

In some embodiments, while the hero has been selected and moved by the one position in the game board area, the display is controlled by the at least one processor to display the location 906 in the battle area to which the hero will move. The location at which the hero stops may be determined such as previously described or in any suitable manner.

In some embodiments, while the hero has been selected and moved to the switched position in the game board area, the display is controlled by the at least one processor to display the path 908 which would be taken by the hero through the battle area to reach the location where the hero stops. This path can be indicated in any suitable manner. For example, as shown in FIG. 9b, a respective dot 908 appears on grid elements from the edge of the battle area adjacent the game board area toward the location to which the hero moves.

In some embodiments, the at least one processor is configured to cause the attack pattern 902 associated with the selected character to be displayed on the display and centred on the grid position 906 to which the hero would move. The attack pattern may be displayed in such a way as to indicate one or more of the grids positions of the attack pattern where an enemy may be attacked. For example, such grid positions may be displayed in a visually distinct manner from those grid positions which are in the attack pattern but which would not result in an enemy being attacked. In some embodiments, the attack pattern may be displayed in one colour with the one or more of the grid positions where an enemy may be attacked in a different colour. In the example show in FIG. 9b, the enemy 904 is located on one of the grid locations of the attack pattern. This means that if the hero is deployed in the battle area, that enemy would be attached by the hero.

If the selected hero is moved by the user input back to its original position and the user input is released, the hero is not deployed and no move is made. This may allow the user to see what attacks could be made by a hero before deciding to deploy that hero. This provides the advantage that a player of the game is able to determine where the hero will move to in the battle area, what skill the hero has and what one or more enemies will be attacked without requiring the user to commit to making that move.

In some embodiments, the at least one processor is configured to control the hero to move along the column of the battle grid which corresponds to the column of the game board area in which the hero is located after selection and moving caused by the user input. This allows the user input to control if the hero is deployed in its current column, the column to the right of the current column or the column to the left of the current column.

In some embodiments, the user input may allow the hero to be moved by more than one position.

In some embodiments, heroes which are created from matching game elements may be treated differently from heroes which are created by combining heroes. In some embodiments, heroes which are created by combining two heroes are deployed in the same turn in which they are created. However, in other embodiments, alternatively or additionally some or all of the heroes created by combining two heroes may remain in the game board area until deployed by the player in a turn.

In some embodiments, the at least one processor is configured to determine if the hero can be moved in the battle area such that there is an enemy within the attack pattern of the hero. If so, the at least one processor will use this determination to control the position to which the hero is moved in the battle area.

In some battle areas, there may be one or more obstacles in the column of the battle area in which the hero will move. The at least one processor may be configured to determine the presence of such an obstacle in the column and in response, the at least one processor is configured to cause the hero to move to the grid location in the battle area next to the obstacle.

In some battle areas, the at least one processor may be configured to determine one or more strategic positions in the column of the battle area to which the hero is moved. The at least one processor may be configured to cause the hero to be moved to the grid element next to the strategic position or to the grid element of the strategic position.

In some embodiments, there may be one or more heroes already on the battlefield in the same column in which a hero is to be deployed. In some embodiments, the at least one processor may be configured to cause the hero to switch position with an already deployed hero and/or overtake an already deployed hero. In some embodiments, the location of an already deployed hero may determine the position at which the hero to be deployed stops. For example, the hero to be deployed may be moved to a position in the battle area grid column next to the already deployed hero. In some embodiments, the position to which the hero to be deployed is moved may depend on the attack pattern of one or more of the hero to be deployed and the already deployed hero.

When a hero is deployed in the battle area, the at least one processor is configured to cause the triggering of an ability for the hero. For example, as the hero is deployed in the battle area, the ability may be triggered. This may be optional in some embodiments. This may show the type of weapon that a hero has and/or may be to highlight to the player that the hero has moved to the battle area.

In some embodiments, this triggering of an ability may cause an effect in the battle area. The effect may be to attack an enemy and/or interact with an obstacle. In other embodiments, no such effect may be provided.

In some embodiments, a hero may be provided with one or more actions. In some embodiments, there may be a limit on the number of actions with which a hero is provided. By way of example only, the number of actions may be 3. However, it should be appreciated that in other embodiments and/or for other types of hero, the number of actions may be more or less than 3.

The action provided may depend on the type of the hero. In other embodiments, all the actions may be the same for all types of heroes.

In some embodiments, the number of actions may depend on the type of hero. In other embodiments, the number of actions may be the same for all types of hero. In some embodiments the effectiveness of the action may be dependent on the level of the hero.

Figure 9C:
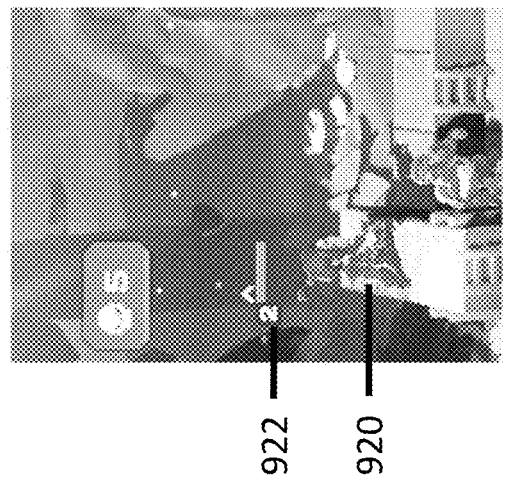
FIGS. 9c and 9d show a hero in the battle area in with information indicating a health of the hero and a number of remaining actions.
Figure 9D:
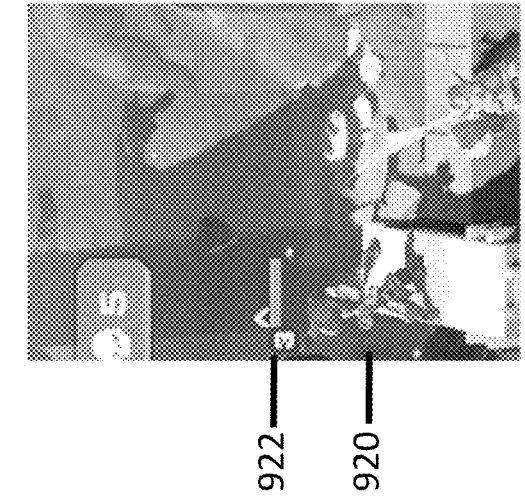

Reference is made to FIGS. 9c and 9d. The at least one processor is configured to cause the display to display a hero 920 shown in FIG. 9c with a visual indication as to the number of actions remaining and the health of the hero. In some embodiments only one of the number of remaining actions and the health may be displayed. In some embodiments, information on only one of the health and the remaining number of actions may be provided on the display.

In some embodiments, a hero may have health but no actions. In some embodiments, a hero may have actions but no health. In some embodiments, a hero may have health and actions.

The hero 920 shown in FIG. 9c is just about to use an action but has not yet used up an action. Accordingly, in the example of FIG. 9c, a health bar 922 with a number is displayed which indicates the number of unused actions and that the hero still has health. In this example, the number of unused actions in 3 and accordingly that number is displayed.

In FIG. 9d, the hero 920 has used one of the actions. According the health bar 922 is displayed with the number 2 indicating that the number of unused actions is 2 and that the hero still has health.

It should be appreciated that in other embodiments, information about the number of actions may be displayed on the display in any suitable manner. The information may indicate a number of unused actions and/or a number of used actions.

It should be appreciated that in other embodiments, information about the health may be displayed on the display in any suitable manner. The information may show a remaining health and/or a used health. The health bar is only one example of how the health may be displayed.

In some embodiments, the at least one processor is configured to cause a health bar or other suitable information may be displayed for one or more enemies. The health bar or other such information may be displayed in a visually distinct manner as compared to that of a hero. For example the health information may be displayed in one colour for an enemy and a different colour for a hero. In other embodiments, the health of a hero may be displayed in the same way as the health for the enemy.

The health may reflect damage which is inflicted on a hero by one or more enemies. If a hero has no remaining heath, the at least one processor is configured to cause the hero to be removed from the battle area even if the hero has remaining actions.

The at least one processor is configured to keep track of the health of the hero. The at least one processor may use a counter function to determine one or more of the amount of used health and the amount of remaining health. A hero will lose health for example as a result of an attack from an enemy.

Each time a hero is attacked, the at least one processor is configured to update the remaining health and/or used health. When the at least one processor has updated the remaining health and/or used health, the at least one processor is configured to determine if the hero has sufficient health to remain in the battle area. When it is determined that the hero does not have sufficient health, the at least one processor is configured to cause the hero to be removed from the battle area. The at least one processor may determine that the hero does not have sufficient health when the hero has no health or the health is below a threshold.

In some embodiments, the hero may acquire health. For example, one or more heroes may provide healing actions which increase the health of one or more other heroes. The at least one processor may be configured to update the remaining health and/or used health when the hero is provided with extra health.

The at least one processor is configured to keep track of the health of the enemy. The at least one processor may use a counter function to determine one or more of the amount of used health and the amount of remaining health. An enemy will lose health for example as a result of an attack from a hero.

The at least one processor may be configured to determine when an enemy has no remaining health and in response to remove the enemy from the battle area. Each time an enemy is attacked, the at least one processor is configured to update the remaining health and/or used health. When the at least one processor has updated the remaining health and/or used health, the at least one processor is configured to determine if the enemy has sufficient health to remain in the battle area. When it is determined that the enemy does not have sufficient health, the at least one processor is configured to cause the enemy to be removed from the battle area. The at least one processor may determine that the enemy does not have sufficient health when the enemy has no health or the health is below a threshold.

In some embodiments, the enemy may acquire health. For example, one or more enemies may provide healing actions which increase the health of one or more other enemies. The at least one processor may be configured to update the remaining health and/or used health when the enemy is provided with extra health.

The at least one processor is configured to keep track of the number of used actions and/or the number of remaining actions. The at least one processor may use the counter function of the user device to determine one or more of the number of used actions and the number of remaining actions.

In some embodiments, where there is more than one enemy in the attack pattern, the hero will attack each one of the enemies in a turn, provided there is a sufficient number of actions. There may only be one action used for a given enemy. For example, if there are two enemies in the attack pattern, then two actions may be used.

In some embodiments, only one action can be used against a given enemy in one turn. Thus, only one attack on one enemy may be made in one turn. For example, if there are two enemies in the attack pattern, then only one action may be used. The at least one processor may be configured to determine which of the two enemies is to be attacked based on one or more criteria.

In other embodiments, the number of actions used against a given enemy in a turn may be more than one. For example, two actions may be used in one turn against one enemy.

In some embodiments, the number of actions which are used in a turn against a given enemy may be dependent on the enemy.

In some embodiments, the number of actions which are usable in a turn may be dependent on the hero.

In some embodiments, the at least one processor is configured to determine when there are no actions left and in response to remove the hero from the battle area.

In some embodiments, there may be a maximum limit on the number of turns for which the hero remains in the battle area. This may be dependent on the maximum number of actions. For example, if a hero has a maximum number of 3 actions, the hero is removed at the latest after 3 turns.

In a turn, the hero will use up one or more actions. For example, a hero may use one action against an enemy in one turn and another action against that enemy in another turn.

In some embodiments, a hero may only use one action per turn.

In some embodiments, the at least one processor may be configured to determine that a hero is unable to use an action against an enemy in a turn. In some embodiments, the at least one processor is nevertheless configured to reduce the remaining actions by one. For example, an enemy may be located at a different height and the attack pattern of the hero is not effective at that height. Another example may be that an obstacle is preventing the user from making an attack or use an action.

In the previous examples, one or more actions are used to attack an enemy. In some embodiments, one or more actions may be used to assist in the removal of one or more obstacle. A given obstacle may be removed if x actions are used. X may be one or more. The actions may be provided by the same hero and/or by different heroes.

In some embodiments, the number of available actions may be reduced in a turn where a hero is positioned with an obstacle in the grid location immediately in front of the hero and in the same column of the battle area. The number of available actions may for example be reduced by one. The action may have no effect on the obstacle. The action may not be used. The hero may, for example, be waiting for an enemy to come into its attack pattern. The hero may be waiting for the removal of an obstacle by another hero or by the shots. In some embodiments, the obstacle may become navigable in a next turn.

In some situations, the at least one processor may be configured to determine that a hero may be unable to use any actions against an enemy and/or an obstacle and/or by waiting by an obstacle. There may be no obstacles between the hero and the edge of the column in which the hero is located in the battle area remote from the game board area. In response, the at least one processor is configured to cause the display to show the hero moving up the column and off the battle area. The hero is thus removed from the battle area.

In some embodiments, the at least one processor may be configured to cause an effect to be provided in the game board area. The at least one processor may be configured to cause the display to display a visualization of this effect. The effect may be provided when the hero has one or more remaining actions. In some embodiments, the effect may be dependent on the number of remaining actions.

The effect provided in the game board area may be any suitable effect. For example, the effect may be to cause one or more game elements may be removed from the game board area. This will cause the game elements in the game board area to be rearranged in the usual way and the game board area to be replenished. This may result in one or more matches being made. Depending on the number and type of matches, one or more further heroes may be provided in the game board area.

In some embodiments, the number of game elements which are removed may be dependent on the number of remaining actions. In some embodiments, one game element may be removed for each remaining actions. In other embodiments, the number of game elements removed may be independent of the number of remaining actions.

In some embodiments, the number of game elements which are removed may be dependent on the hero.

In some embodiments, a hero which is removed may be associated with a given game characteristic. This may for example be colour. The one or more game elements which are removed may have the same characteristic as the removed hero.

It should be appreciated that alternatively or additionally, the at least one processor may be configured to cause one or more heroes with one or more remaining actions to be removed based one or more additional or alternative criteria. For example, a hero may be removed if there is insufficient room to accommodate that hero or room is being made for another hero. For example, a hero may be removed if the hero fails to attack an enemy in a turn.

Figure 9G:
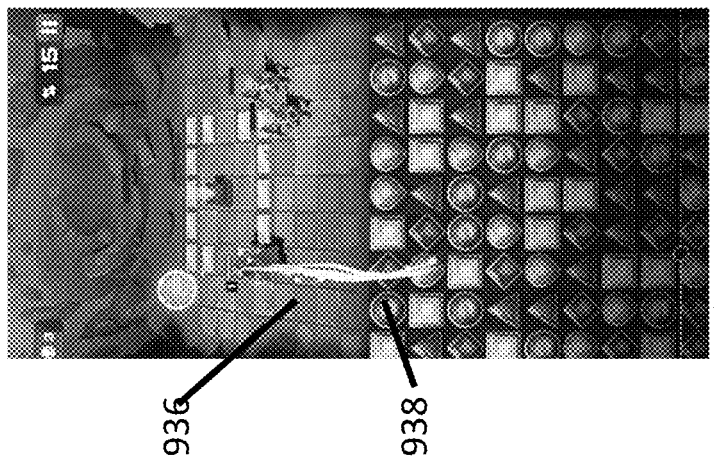
FIGS. 9e to 9g show screen shots of one example where a hero is deployed in the battle area.
Figure 9F:
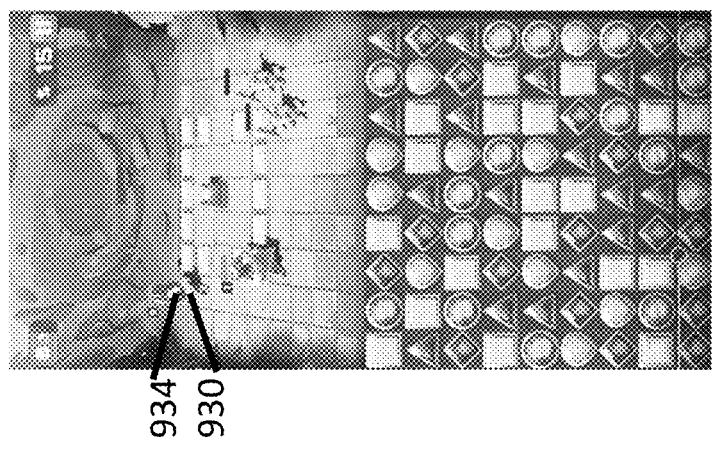
Figure 9E:
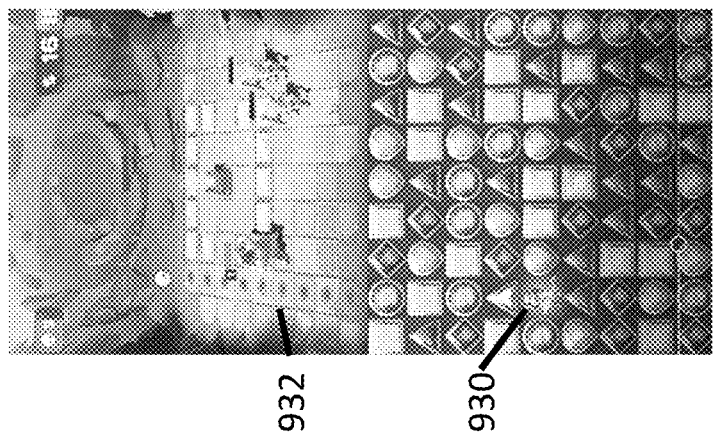

Reference is made to FIGS. 9*e, f* and *g*. In FIG. 9*e* a hero 930 is selected in response to user input received via the user interface. The at least one processor is configured to determine and highlight the path 932 on the display for the hero in the battle area. In this example, there is no enemy, obstacle and/or the like so the path of the hero is such that the hero would move up the column of the battle grid and off the battle area.

FIG. 9*f* shows the selected hero 930 at the edge 934 of the grid of the battle area.

FIG. 9*g* shows that as the hero moves off the battle area, the at least one processor is configured to cause an interaction with the game board area. This interaction may be visually highlighted 936 on the display. For example, as the hero leaves the battle area, a shot is seen coming from the hero to the game board area. This interaction may be the effect previously described.

The interaction may comprise the removal of one or more game elements from the game board area and/or the changing of the characteristic of one or more game elements and/or the providing of one or more heroes in the game board area.

In the example show in FIG. 9*g*, the at least one processor is configured to cause a game element to be removed from column 938 of the game board area. The removal of one or more game elements may trigger the making of one or more matches.

In some embodiments, the interaction with the game board area may be dependent on the hero. For example, the number of game elements removed may depend on the hero.

In some embodiments, the interaction provided may be dependent on the number of actions associated with the hero.

In some embodiments, a user may select a hero to deploy and there may be one or more other heroes in that same column. In some embodiments, once hero is selected to be deployed, the at least one processor is configured to cause all the heroes in that same column to be deployed. In some embodiments, only the selected hero is deployed. In some embodiments, when a hero is selected to be deployed, the at least one processor is configured to cause all the heroes in the same column as the selected hero and between that selected hero and the battle area to be deployed in the battle area. In some embodiments, the decision as to whether or not to deploy one or more of other heroes may depend on the type of a respective other hero and/or the type of the hero which has been selected to be deployed.

In some embodiments, the at least one processor is configured to determine that a hero has been selected for deployment. The at least processor is configured to cause the display to show the hero moving up at the column. Each time the hero reaches the next location in the column of the game board, the at least one processor is configured to determine if there is a second hero in that location. If there is the at least one processor is configured to cause that second hero in that location to be deployed and to follow the initially deployed hero to the battle area.

In some embodiments, the at least one processor is configured to repeat the determination for the next location in the column and so on. In the event that there is a further hero, the further hero is also caused to be deployed. The at least one processor is configured to cause the further hero to follow the initially deployed hero and the second hero. Accordingly, the initially deployed hero may be the first to arrive at the battle area, followed by the second hero which is in turn followed by the further hero.

As an alternative to an iterative process, the at least one processor is configured to determine the location of the heroes in the column of the hero which has been triggered. The at least one processor may determine the location of heroes in the column which are between the triggered hero and the battle area or may determine the location of heroes in any position in the column of the triggered hero.

Based on the location of one or more other heroes, the at least one processor may be configured to determine the order in which the heroes to be deployed arrive at the game area.

In some embodiments, where more than one hero from a given column is deployed, the at least one processor will cause the heroes to be deployed in the battle area in the same order in which they occur in the column of the game board area.

In some embodiments, where more than one hero from a given column is deployed, the at least one processor will cause the heroes to be deployed in the battle area in the same order in which they are triggered the column of the game board area. This means that the selected hero would arrive before the second hero which arrives the third hero In some embodiments, the at least one processor may be configured to make a determination as to whether the order of one or more of the heroes is to be changed. The order of the heroes may be changed in the game board or when the heroes are in the battle area This determination may be based on the attack pattern of the respective heroes. For example, the one or more heroes with a melee attack pattern will go first followed by the one or more heroes having a ranged attack pattern.

In some embodiments, the at least one processor may be configured to determine if two or more heroes are in the same column and are to move onto the battle area in the same turn.

When the at least one processor determines that the two or more heroes are in the same column and are to move onto the battle area in the same turn, the at least one processor is configured to use information about the respective attack pattern of the respective heroes in order to determine if the order in which the heroes leave the game board area is to be changed. The information about the respective attack patterns may be stored in at least one memory.

The heroes will be provided in the battle area in the order determined by the at least one processor.

In some embodiments, the at least one processor may be configured to determine a stop location for a lead hero. This stop location may be as previously discussed. The at least one processor may be configured to determine the number of available grid positions including the stop location and to determine the number of heroes to be accommodated. If the number of available grid positions is less than the number of heroes to be accommodated, one or more of the heroes may be removed from the battle area.

The one or more removed heroes may be treated as if there were no stop location, such as described in relation to FIGS. 9*e* to *g*. In other embodiments, instead of removing a hero which cannot be accommodated in the battle area, that hero may remain in the game board area or may be deployed in a different column of the battle area. In the latter case the at least one processor may be configured to cause the hero to be accommodated in such a way as to appear to be moving around an obstacle or the like.

In some embodiments, the at least one processor may be configured to use any suitable criteria to determine which one or more hero is to be removed or not deployed in the battle area. This may be based on the strength of the different heroes and/or the attack pattern of the heroes. For example, the at least one processor may be configured to ensure that as many of the different attack patterns as possible are provided by the heroes from the same column. In some embodiments, the at least one processor may be configured to ensure that the number of each of the attack patterns is as balanced as possible.

In some embodiments, the hero which is to be removed or not deployed may be selected by the at least one processor on the basis of the position of that hero in the column of the game board area.

In some embodiments, the hero which is to be removed or not deployed may be dependent on the characteristics of one or more enemies.

In some embodiments, the heroes move from the game board area to the battle area in the order determined by the at least one processor.

In some embodiments, the heroes move from the game board area to the battle area in an order such as previously discussed. However, the heroes will stop at the respective locations determined by the at least one processor. This may mean that one or more heroes will stop at a given battle grid location and be overtaken by one or more other heroes moving to their respective determined position.

It should be appreciated that in some embodiments, only one hero may occupy a given grid location in the battle area.

It should be appreciated that the heroes created by combining heroes may be treated in the same or similar way to the heroes created from a match. The triggering of the heroes created from the combining of two heroes may cause one or more other heroes in the same column to be caused to move to the battle area such as described previously.

In some embodiments, the at least one processor is configured such that removal of more game elements in the game board area may cause an effect in the battle area. In some embodiments, for each game element removed from a column of the game board area a shot is provided in the corresponding column in the battle area. The shots may result from the match made by the user or by a subsequent match triggered as a result of one or more game elements being removed as a result of a match being made or the deploying of one or more heroes.

For example if a match is made in a column of three game elements, 3 shots will be provided in the corresponding column of the battle area. For example if a match is made in a row of three game elements, one shot will be provided in each the corresponding columns of the battle area.

It should be appreciated that matches of four or more game elements may provide a respective number of shots in the respective column or columns.

In some embodiments, the shots may only be provided for a match of three game elements as matches of more than four game elements provide a hero. In other embodiments, shots are provided where there is a match of four or more game elements.

In some embodiments, the shots will be associated with a characteristic of the matched game elements. For example, the shots may be associated with a colour of the game element. The at least one processor may be configured to determine the characteristic of the matched game elements and the column location of each of the matched game elements. For each of the matched game elements, the at least one processor is configured to provide a shot in the respective column of that game element and having a characteristic dependent on the characteristic of that game element. This may be regarded as colour shot or blast.

In some embodiments, one or more obstacles may be removed using one or more shots. These obstacles may alternatively or additionally be removed by one or more actions from one or more heroes.

The at least one processor may be configured to determine that an obstacle has been hit and to determine if the obstacle can be removed. Where more than one shot or action is required to remove the at least one obstacle, the at least one processor is configured to determine if the required number of shots and/or actions have been received. The at least one processor may be configured to update a counter each time an obstacle is hit by a shot and/or actions. The at least one processor may be configured to determine each time the counter is updated if the counter has reached a threshold. When the processor determines that the counter has reached the threshold, the at least one obstacle is removed. In some embodiments, the appearance of the obstacle may change depending on the number of times that the obstacle has been hit. The at least one processor may be configured to use the value of the counter to control the appearance of the obstacle. The appearance of the obstacle may be changed so that it appears to have increasing damage.

In some embodiments, an obstacle may be associated with a given characteristic such as colour. An obstacle associated with a given characteristic or colour may be removed by a given number of shots associated with the same characteristic or colour. The at least one processor may in this case only update the counter if the shot is associated with the required characteristic and/or the action is provided by a hero associated with the required characteristic.

In some embodiments the given number of shots to remove an obstacle may be 3. In other embodiments, the given number of shots may be more or less than 3. In some embodiments, different obstacles may require a different number of shots in order to remove that obstacle.

In some embodiments, the given number of shots needed to remove an obstacle may need to be received in a given turn. The shots may result from the match made by the user or by a subsequent match triggered as a result of one or more game elements being removed as a result of a match being made or the deploying of one or more heroes. In some embodiments, the at least one processor may be configured to reset the counter at the end of a turn.

In some embodiments, if the obstacle does not receive required number of shots or the required number of shots with the required characteristic within a turn, the at least one processor may be configured to reset the number of shots required may. For example if a given obstacle requires 3 shots of a particular colour in order be removed and only 2 shots are received during the turn, for the next turn 3 shots of the particular colour would be required to remove the obstacle.

In other embodiments, the required shots may be accumulated across two or more turns. There may or may not be a limit on the number of turns in which the shots need to be acquired in order to remove the obstacle.

In some embodiments one or more of the enemies may be damaged by one or more of the shots provided in the corresponding column. In some embodiments, an enemy may be associated with a given characteristic such as colour. In some embodiments, the enemy may only be damaged if the shot has the given characteristic of the enemy. In some embodiments a predetermined number of shots, optionally with the given characteristic need to be received in the given turn to cause damage to the enemy. The at least one processor may be configured to determine if a shot has hit an enemy and if that shot is associated with the same characteristic as the enemy (if required) and in dependence on that determination to update the health of the enemy. The at least one processor may further determine if the required number of shots, optionally of the required characteristic, have been received before updating the health. The health may be reduced. When the health has been updated, the at least one processor may be configured to determine if the enemy has sufficient remaining health to remain in the battle area or if the enemy has insufficient health is to be removed from the battle area.

In some embodiments one or more shots in the corresponding column may be used by a hero to increase the health of the hero. In some embodiments, there may need to be a threshold number of shots in order for the health of the hero to be increased. In some embodiments, the threshold number of shots may be across two or more turns. In some embodiments, the threshold number of shots may need to be within one turn.

In some embodiments, where the hero is associated with a given characteristic, one or more shots associated with same given characteristic may be required to increase the health of the hero.

The at least one processor may be configured to determine if a shot has hit hero and if that shot is associated with the same characteristic as the hero (if required) and in dependence on that determination to update the health of the hero. The at least one processor may further determine if the required number of shots, optionally of the required characteristic, have been received before updating the health. The health may be increased up to but not beyond a maximum.

Alternatively or additionally one or more one or more shots in the corresponding column may be used by a hero to increase the number of actions or turns of the hero. In some embodiments, there may need to be a threshold number of shots in order for the number of turns or actions of the hero to be increased. In some embodiments, the threshold number of shots may be across two or more turns. In some embodiments, the threshold number of shots may need to be within one turn.

In some embodiments, where the hero is associated with a given characteristic, one or more shots associated with same given characteristic may be required to increase the number of turns or actions of the hero.

In some embodiments, a given shot may be used once. For example, a shot can be used for increasing the health of a hero or decreasing the health of an enemy or for removing an obstacle. In some embodiments, a shot may have no effect on the battle area, if that shot does not encounter a suitable obstacle, hero and/or enemy.

Figure 10:
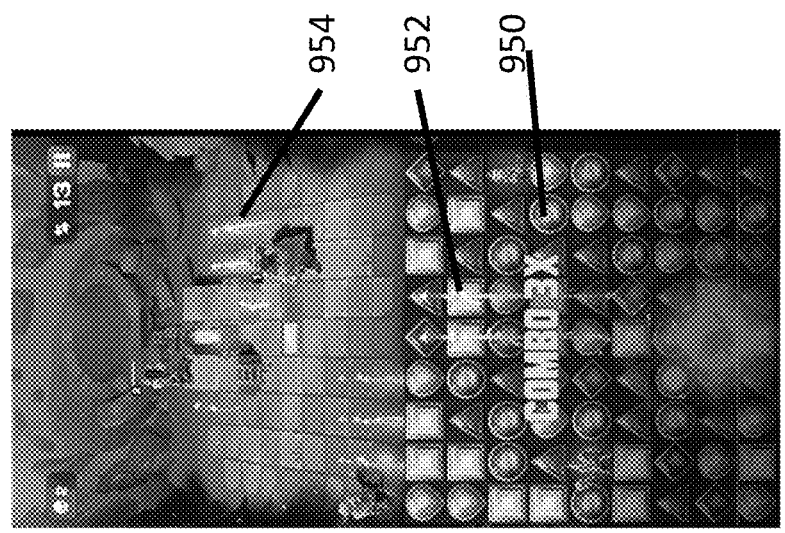
FIG. 10 shows a screen shot with information indicating matches made during a turn.

Reference is made to FIG. 10. In some embodiments, the at least one processor may be configured to cause an indication to be displayed as to number of matches which have been made in a turn. As shown in FIG. 10, when a move is made in game and there is a subsequent match triggered in the turn, "combo nX" is displayed where n is the cumulative number of combinations or matches occurring in that turn. This will indicate the number of matches which have been made. Each time an additional match is made, the at least one processor may be configured to update the current number of matches and cause updated information is displayed. For example, when a second match or combination is made, "combo 2x" is displayed followed by "combo 3x" when a third match or combination is made within the same turn and so on. FIG. 10 shows that three combinations have been made in the turn as referenced 950.

In some embodiments, the at least one processor may be configured to increment a counter each time a match is made.

In some embodiments, the at least one processor may be configured to determine the number of the current match and in response to determine a strength of the shot which is provided in the battle area for a respective game element of the match. The shot may be as previously described. In some embodiments, the effect provided by the shot is increased in dependence on the current number of matches. For example, a shot resulting from the second combination or match may be weaker than a shot resulting from the fourth combination or match. For example, a stronger shot may reduce the health of the enemy by more than a weaker shot. A stronger shot may increase the health of the hero by more than a weaker shot. In some embodiments, the at least one processor may be configured to update the health of the hero or enemy in dependence on the strength of the shot.

In some embodiments, the at least one processor is configured to cause information about the characteristic of the latest matched game elements to be provided. For example, in some embodiments, where the characteristic is a colour, the information which is displayed may be in the colour of the match.

In some embodiments, the at least one processor is configured to cause information to be displayed on the display which provides information to the user as to which columns the matching elements are located and the effect of the shots on the battle area. This may be provided by a respective shot being provided. The respective shot may begin at a position defined by the location of the respective removed game element. The respective shot may be provided in the same colour as that of the removed game element. The shot may move up the column of the game board area in which the respective removed game element was located. Reference 952 shows a shot moving through the game board area. The shot may continue up into the respective column of the battle area. Reference 954 shows a shot moving through the battle area. The shot may move off the battle area if there is nothing in the path of the shot. The shot may alternatively interact with one or more of a hero, an enemy or an obstacle such as discussed previously.

It should be appreciated that any other suitable information may be displayed in order to indicate the number of matches which have been made.

In some embodiments, a set of heroes are provided to play one or more different levels of the game. In some embodiments, the set of heroes may be selected by the at least one processor. In some embodiments, the set of heroes is selected in response to user input received via the user interface. In some embodiments, the at least one processor may select a default set of heroes or the heroes that were previously used in a previous level or a previous attempt at that level. In response to user input received via the user interface, the default set of heroes can be edited to allow one or more different heroes to be provided in the set of heroes.

In some embodiments, the heroes which are in the set of heroes determine which heroes are provided in the game board area when a match is made. In some embodiments as discussed previously, the game elements have one or more characteristics which are used when determining if a match condition exists. By way of example, one characteristic may be colour. In some embodiments, there may be n different ones of a given characteristic for the game elements. For example, there may be n different colours of game elements in the game board area. In some embodiments, a set of heroes may comprise at least one hero associated with each of the n different characteristics. In some embodiments, a set of heroes may comprise only one hero for each respective one of the n different characteristics. In some embodiments there may be one hero for each characteristic. If there are n different characteristics, there are n different heroes, one for each different characteristic.

A hero may be associated with a single characteristic in some embodiments. In some embodiments, a hero may be associated with two or more different characteristics. In the described embodiments below, a hero is associated with a single characteristic.

A hero associated with a given characteristic is created during the game when the at least one processor determines that game elements having the given characteristic satisfy a match condition.

In the example shown in FIG. 12*a*, n is five and accordingly there are 5 heroes 1202 in the set 1200 of heroes. Each of the heroes are associated with a different one of the characteristics such as colour. In some embodiments, the visual representation of a given hero may be such as to indicate to the player a shared characteristic with the associated game elements. This may for example be the colour of the hero and/or clothing of the hero and/or the like. Accordingly, in the example shown in FIG. 12*a*, each of the heroes has a visual indication indicating which characteristic that hero is associated with.

In some embodiments, the at least one processor may be configured to cause the display to display information 1206 indicating a power or level of a respective hero in the set of heroes. This may be in the form of a number or in any other suitable way.

In some embodiments, the at least one processor may be configured to cause the display to display information 1204 indicating one or more of the type of attack, the attack pattern, the ability of the hero or action of a respective hero in the set of heroes. This may be in the form of a graphical representation or in any other suitable way. The graphical representation may for example show the weapon used by the respective hero.

In some embodiments, there may be a plurality of different heroes available for selection for a given characteristic. The different heroes available for selection for a given characteristic may be associated with different attack patterns and/or different powers and/or different attributes and/or abilities which are provided in the interaction area. In some embodiments, the user is able to increase the number of different heroes available for selection for a given characteristic by playing the game.

The hero referenced 1208 is currently provided in the set of heroes but is a hero where there is an alternative hero available for selection.

In some embodiments, the at least one processor may be configured to cause information about one or more enemies 1220 which will be encountered when the play option is selected to be displayed on the display. In the example shown in FIG. 12*a*, the information may comprise a visual representation of the enemy. Alternatively or additionally information may be provided which indicates one or more of an attacking ability of the enemy and a strength or power of the enemy.

In the example shown in FIG. 12*b*, the user has provided user input via the user interface and in response the at least one processor is configured to allow the user to edit the squad. For example, the user may provide user input, via the user interface, associated with a hero having a respective characteristic. This user input may be any suitable user input such as clicking on the respective character. In response to the user input, the at least one processor may be configured to display available heroes having the respective characteristic. In the example shown in FIG. 12*b*, the available heroes 1208 and 1210 may be shown. The currently selected hero 1210 is shown on the far right of the set of heroes. The at least one processor may be configured to cause the display to display a visual indication with one or more of the available heroes to indicate which one of the available heroes is currently in the set of heroes. In the example shown in FIG. 12*b*, the hero referenced 1210 is currently in the set of heroes.

In some embodiments, the at least one processor may be configured to cause the display to display information indicating a power or level of an available hero. This may be as previously described in relation to the set of heroes.

In some embodiments, the at least one processor may be configured to cause the display to display information indicating the type of attack or action of an available hero. This may be as previously described in relation to the set of heroes.

As shown in FIG. 12*c*, a user input has been received via the user interface to select the hero referenced 1208. In response, the at least one processor is configured to cause the display to display the selected hero 1208 in the set of heroes.

As shown in FIGS. 12*a* to 12*c*, there is a play option 1222 displayed on the display. In response to user input received via the user interface selecting the play option, the at least one processor is configured to cause the level or a set of levels to be played with the selected set of heroes. The at least one processor may be configured to cause the display to display a game board area such as described previously with an associated battle area. When a match satisfying the criteria to cause a hero to be provided occurs, the hero associated with the characteristic of the matching game elements is provided.

Where the enemy is associated with a given characteristic, a hero having that given characteristic may be able to inflict more damage on that enemy as compared to a hero not sharing that given characteristic.

In some embodiments, one or more different game entities may be provided in the game.

In some embodiments the grid arrangement may be a 2 dimensional arrangement. In some embodiments, each grid element may be generally square. In other embodiments, each grid element may have a different shape, for example rectangular or any other shape.

In some embodiments, the grid arrangement may be a 3 dimensional arrangement. In some embodiments, the grid arrangement may have a height dimension. The height dimension is also defined with respect to a grid arrangement. In some embodiments the maximum height dimension may be less than the row or column dimension. For example, the maximum height dimension may be 2 grid units in the height direction. Each grid element in a 3 dimensional arrangement may be a cube or any other suitable grid unit. In some embodiments, there may be a base level in the grid arrangement with a height dimension of zero. In some embodiments one or more obstacles or other game entity may be provided in the battle zone which have a height of one grid unit or two grid units. This may provide three different height options in some embodiments. It should be appreciated that the number of possible heights may be more or less than three.

Figure 11:
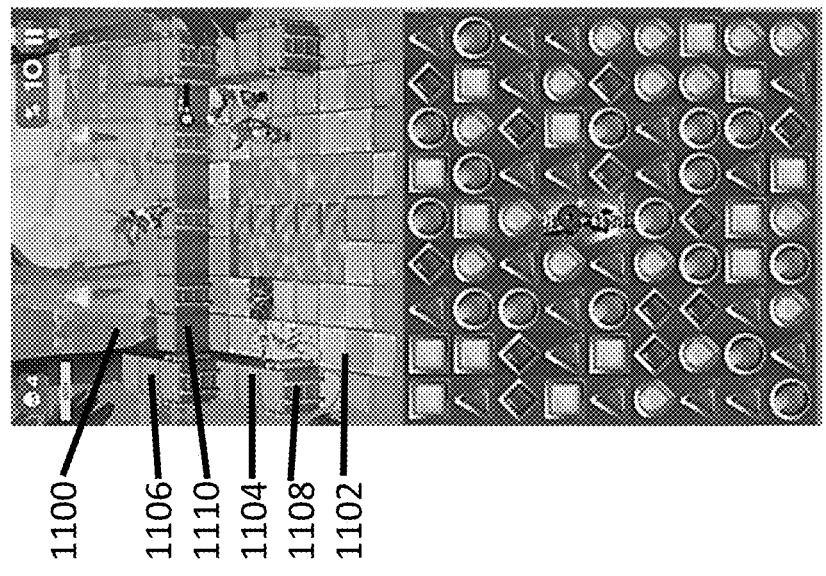
FIG. 11 shows a screen shot of a battle area having three different heights.

Reference is made to FIG. 11 which shows an example of a battle area 1100 which comprises 3 levels or heights. The first level is the base level 1102. A second level 1104 is provided one unit higher than the base level. A third level 1106 is provided which is accessed via the second level and which is two units higher than the base level. When a hero is deployed from the game board area, the hero will run along the corresponding column of the battle area. A hero will be able move up to from the current level to the next level if an item 1108 is provided in the battle area which allows the hero to transition from one level to the next. This item may be represented as a ladder, a ramp, a staircase, an elevator or in any other suitable manner. If there is no such item between the levels, such as referenced 1110, then the increased level will act as an obstacle and prevent the character from moving further in that column.

In some embodiments a particular item to transition from one level to another may only be usable by one or more but not all of the heroes.

In some embodiments, the level and/or the characteristics and/or the power of the hero may determine if the hero is able to use a particular item to transition from one level to another.

In some embodiments, any hero may be able to use any item to transition from one level to another.

It should be appreciated that in some embodiments, the enemies in the battle area use the same items to transition from one level to another. In some embodiments different items may be accessible by the enemies as compared to the heroes.

In some embodiments, as previously discussed, the attack pattern of the hero may only be effective for the level at which the hero is currently located. In some embodiments, one or more of the attack patterns may be effective for the level at which the hero is located and/or one or more other levels. Any of the previously described attack pattern options may be used in a 3D battle area.

This may allow the user to make strategic choices as to which hero to deploy. For example, the hero may be on one level and the enemy may be on a different level. The player can choose a hero with an attack pattern/type which extends from one level to the other in order to attack the enemy. The hero may have a weapon such as an arrow which can be shot at an enemy at a different height.

In another scenario, the hero may have an attack pattern which is on one level only. The player can choose to deploy that hero in a column where there is an item for transitioning from one level to another.

In some embodiments, one hero may be able to cause an item to be available for another hero. For example, one of the actions of one hero may cause an item for transitioning from one level to another. In other embodiments, movement of one hero to a particular location may cause an item to transition from one level to another to be available.

In some embodiments, the enemies may have respective attack patterns. These attack patterns may be similar to those discussed in relation to the heroes. This can be used by the player when determining a strategy. For example, an enemy may be on first height level and have an attack pattern on that same level. The player may choose to use a hero which moves on a different level but has at least a part of the attack pattern on the same level as the enemy. Thus the hero can attack the enemy without itself being attacked by the enemy.

In some embodiments, the game may comprise a plurality of different game levels which can be completed by a player. Different game levels may be associated with one or more different heroes and/or one or more different enemies. Different levels may be associated with different battle areas. Different heroes may be acquired by playing different areas.

In some embodiments, one or more heroes may be acquired and/or upgraded by completing a game challenge. This game challenge may be to complete a set of levels for example. This may be represented by a chest. When the player initially starts the levels a locked chest is displayed. An indication of the available heroes and/or upgrades may be shown. When the set of levels have been successfully completed, the at least one processor is configured to provide the available heroes and/or upgrades. The at least one processor may be configured to cause the display to display the chest as being opened to provide the one or more available heroes and/or upgrades.

In some embodiments, the chest may provide one or more cards. When a player has collected a given number of a particular card, a particular hero may be provided.

In some embodiments, a hero which is available may be selected for use in a set of heroes such as previously described.

In some embodiments there may be a plurality of different game areas. The player may be able to select one or more of these game areas. When a game area is selected there may be one or more levels that can be played. In some embodiments, the at least one processor may be configured to determine which or more game areas are currently available.

In some of the previously described embodiments, the visual representation of the hero used in the game board is the same as that used in the battle area. In other embodiments, the visual representation of the hero used in the game board may differ from that used in the battle area. In this regard, reference is made to FIGS. 15a to c which shows the appearance of the hero on the gameboard. In this example, the representation of the hero in the battle area may be as previously described.

Figure 15C:
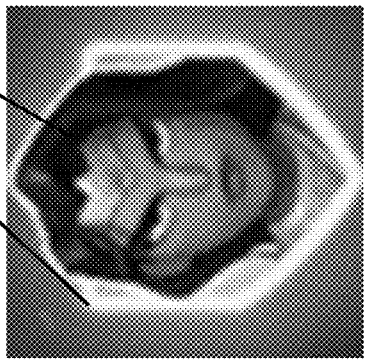
FIGS. 15a to 15c show another visual representation used for the heroes in a game board areas.
Figure 15B:
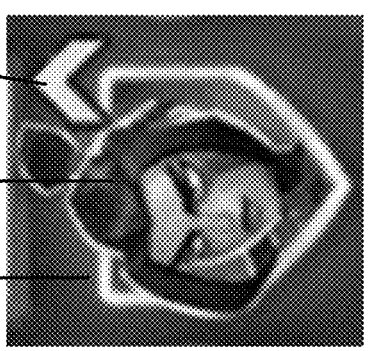
Figure 15A:
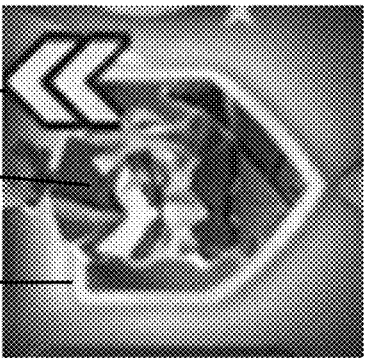

The hero of FIG. 15a is a hero of the third level. The visual representation comprise a frame part 1500. In some embodiments, where the hero shares a colour characteristic of the matched game elements, the frame may be provided with this colour characteristic. Alternatively or additionally, the colour characteristic may be indicated by use of that colour as a background or in any other suitable way.

In the example shown in FIG. 15a, a head 1502 of the hero is provided. In this example, the head is only partially contained in the frame. In other embodiments, the head may be completed contained within the frame. In other embodiments, a different visual indication may be used to represent the hero in the game board such as a symbol or the like.

In the example shown in FIG. 15a, the two sergeant stripes 1504 are displayed to indicate that the hero is of the third level. The sergeant stripes may be displayed adjacent the head of the hero or in any other suitable location.

The hero of FIG. 15b is the hero of the second level. The visual representation again comprises a frame part 1500 such as discussed in relation to FIG. 15a. In the example shown in FIG. 15b, the head 1502 of the hero is provided such as discussed in relation to FIG. 15a. In the example shown in FIG. 15b, one sergeant stripe 1504 is displayed to indicate that the hero is of the second level. The sergeant stripe may be displayed adjacent the head of the hero or in any other suitable location.

The hero of FIG. 15c is the hero of the first level. The visual representation again comprises a frame part 1500 such as discussed in relation to FIG. 15a. In the example shown in FIG. 15c, the head 1502 of the hero is provided such as discussed in relation to FIG. 15a.

Figure 15E:
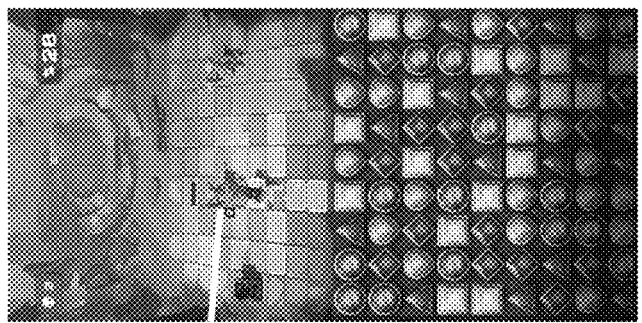
FIGS. 15d and 15e show another visual representation used for movement of a hero from the game board area to the battle area.
Figure 15D:
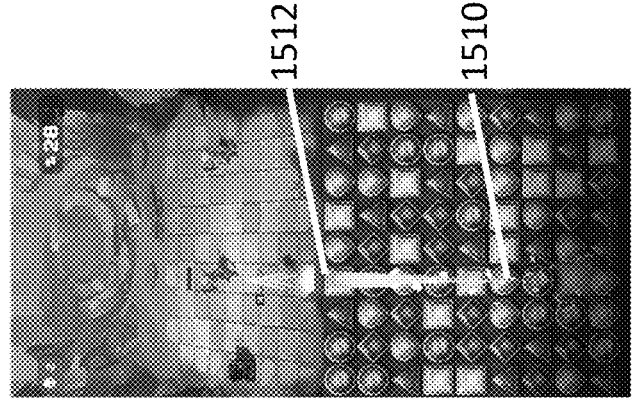

Reference is made to FIGS. 15d and 15e which shows the selection of a hero in the game board such that the hero is provided in battle area. The hero is selected in any suitable way such as previously described. For example a user input may be received via the user interface to switch the hero with a game element. The at least one processor may be configured to cause the display to display the hero moving from its switched position to the battle area in any suitable way. In the example shown in FIG. 15d, the at least one processor is configured to cause the display to display a moving arrow 1515 or streak of light or the like. This is to visually represent movement of the hero towards the battle area. The at least one processor is configured to cause the displayed movement to start from the position 1510 on the gameboard to which the hero has been switched. This example contrasts with some of the previous examples where a representation of the hero is shown as moving from the game board to the battle area, with the same representation used in the game board and the battle area. In contrast, in this example, a representation of the movement only without the representation of the hero is provided in the game board.

When the representation of the hero reaches the battle area, the at least one processor is configured to cause the visual representation 1514 of the hero used in the battle area to be provided, as shown in FIG. 15e.

In some embodiments, this battle area representation is provided as soon as the hero enters the battle area. In other embodiments, the at least one processor is configured to combine the transformation to the battle area visual representation with a visual representation of the movement of the hero in the battle area (this may be such as shown in FIG. 15d). This may mean that the visual representation of the hero in the interaction area is only fully formed two or more rows into the interaction area.

It should be appreciated, that in other embodiments, where the visual representation of the hero in the game board is different to the visual representation of the hero in the battle area, the game board representation of the hero may be shown as moving to the battle area and then changing to battle area representation when the hero reaches the battle area.

Alternatively, the game board representation may be changed to the battle area representation when the hero is switched and the battle area representation of the hero moves from the position in the game board to which the hero has been switched to the battle area.

Figure 16C:
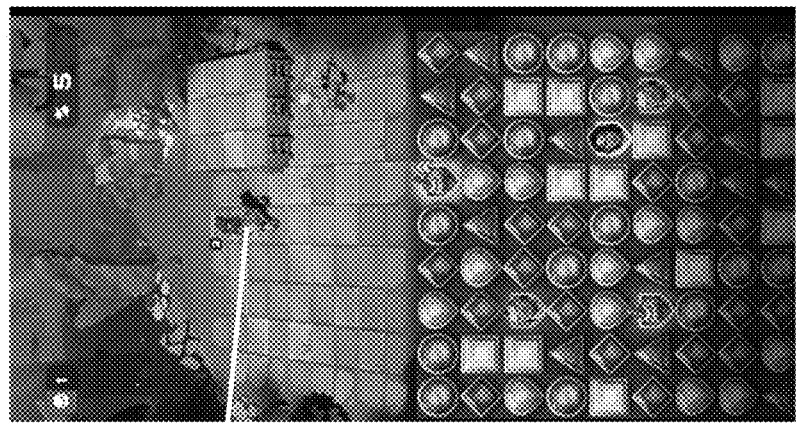
FIGS. 16a to 16c show another visual representation used when two heroes are selected and one resulting hero is provided in the battle area.

In the previously described examples, if two heroes are switched and one or both of the heroes is of the first level a more powerful hero is created which is represented as a single large sized hero in the game board. This larger sized hero as previously described is visually represented as a larger sized hero in the game board and in the battle area. An alternative to this will now be described with reference to FIGS. 16a to 16c. In this example, two heroes 1602 are switched. The two heroes 1602 are shown in FIG. 16a before they have been switched. In this example, both of the heroes are of the first level and are represented in the game board such as described in relation to FIG. 15c.

Figure 16B:
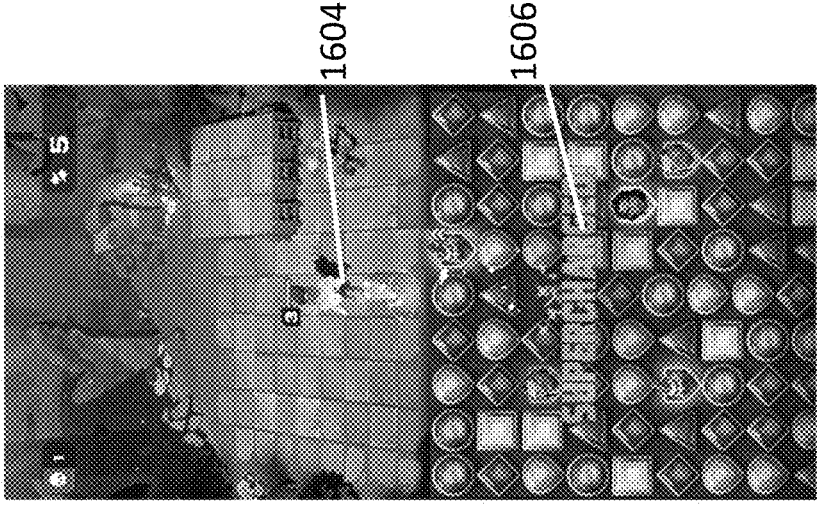
Figure 16A:
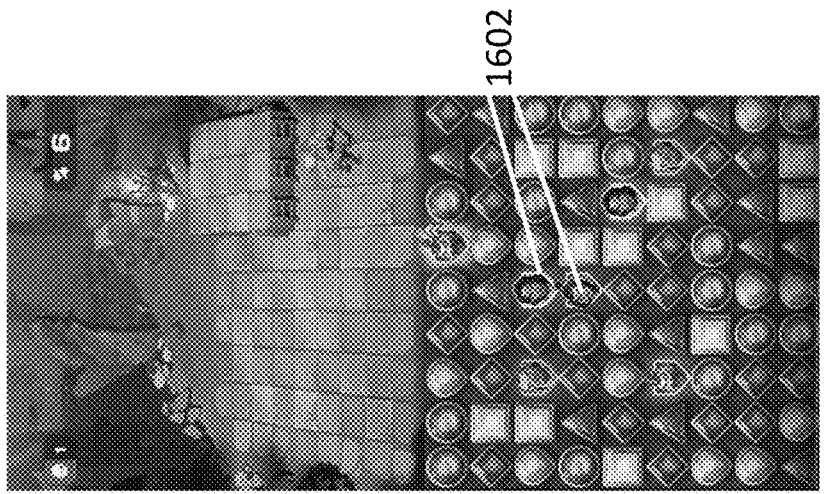

Referring next to FIG. 16b, when the two heroes have been switched, the at least one processor is configured to cause a visual indication 1606 to be displayed in the game board to indicate that a more powerful hero is being provided. In this example, this is indicated by the word "supercharged". However this is by way of example only and the visual indication may be any other suitable word or in any other way.

As previously described in relation of the FIG. 15d, when a hero is selected in the game board such that it moves from game board to the battle area, a visual representation of the movement is displayed. As can be seen from FIG. 16b, the visual representation of the hero in the battle area is a combination of the visualization of the movement of the hero in the battle area and the transformation from the movement visualisation to the battle area representation.

FIG. 16c shows the hero 1608 in the battle area with the battle area visualization completed.

It should be appreciated that in some embodiments, the hero which is created by switching two heroes in the game board may be visually represented in the battle area as a larger sized hero. In some embodiments, where at least one of the two heroes which is switched is of a first level, the at least one processor is configured to represent the created hero in the game board as a larger sized hero.

In other embodiments, where both of the two heroes which are switched are of a first level, the created hero is not a larger sized hero. However, if one of the heroes which is switched is of the first level and the other of the heroes which is switched is of the second level or the third level, then the created hero is visually represented in the game board as a larger sized hero.

Figure 16E:
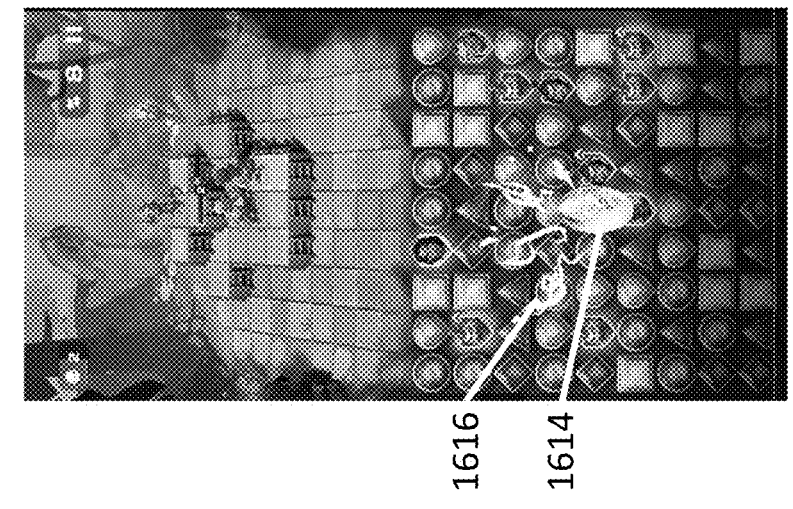
FIGS. 16d and 16e show another visual representation used when two heroes are selected on the game board which provide an army of heroes in the battle area.
Figure 16D:
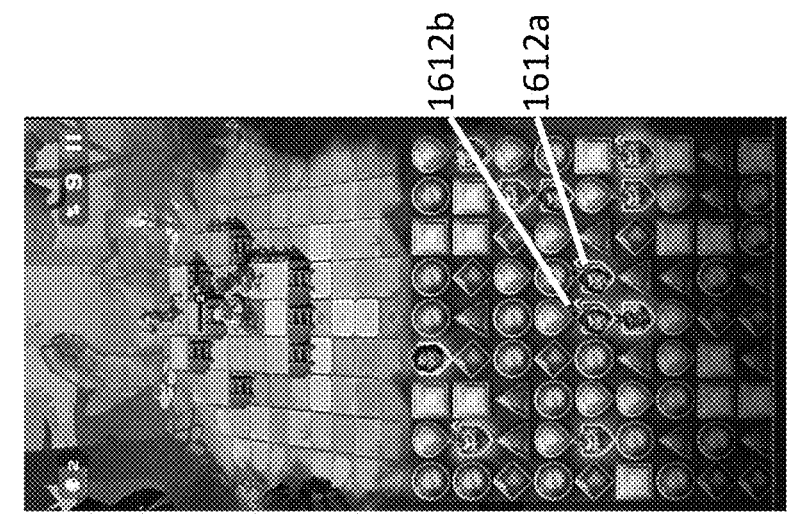

In the previously described examples, if two heroes are switched and both of the heroes is of a second level and/or a higher level, an army of heroes is created. An alternate visualization of this will now be described with reference to FIGS. 16d and 16e. In this example and as shown in FIG. 16d, two heroes 1612a and 1612b are switched. The two heroes 1612a and b are shown in FIG. 16a before they have been switched. In this example, both of the heroes are of the second level and are represented in the game board such as described in relation to FIG. 15b.

The hero 1612a which is selected and switched with the hero 1612b is, after switching represented in a visually distinct manner as compared to the switched hero 1612b. This is shown in FIG. 16e where the selected hero 1612a is represented as oval of energy in its switched position. Additionally, visual indications 1616 of movement are provided from this oval of energy to the positions in the game board for the respective heroes of the army. The visual indications may be arrows or provided in any other suitable way. It should be appreciated that the position of the army of heroes in the game board may be as described previously.

The movement of the army of heroes in the game board and onto the battle area may be as previously described in relation to FIGS. 15d and e. It should be appreciated that the created army may be visualised only in the game board by a moving arrow or streak of light or the like. This may be from a respective position in a column. This respective position may be determined such as previously discussed or in any suitable way.

Figure 17C:
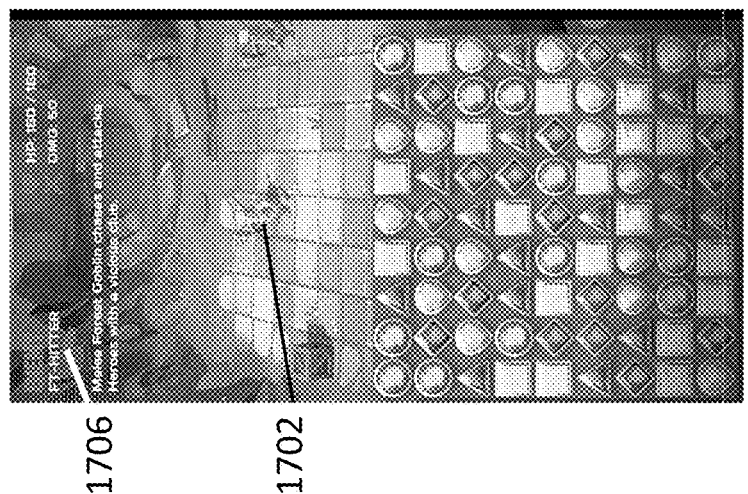
FIG. 17c shows a screen shot when an enemy in the battle area is selected by user input received via the user interface.
Figure 17B:
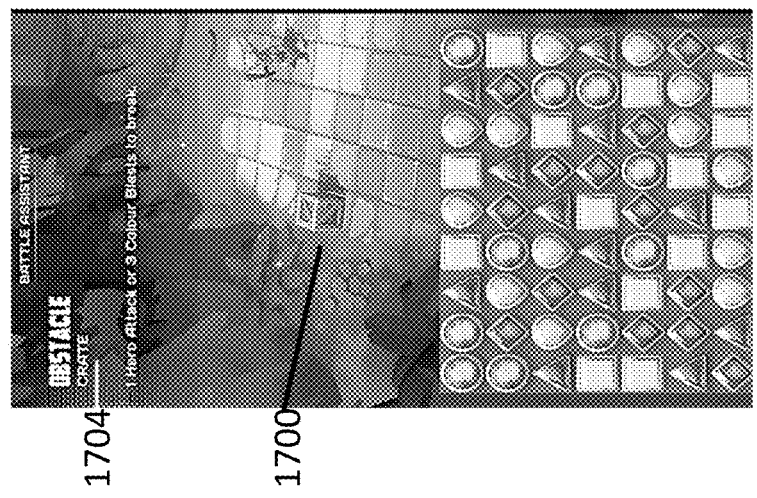
FIG. 17b shows a screen shot when an obstacle in the battle area is selected by user input received via the user interface.
Figure 17A:
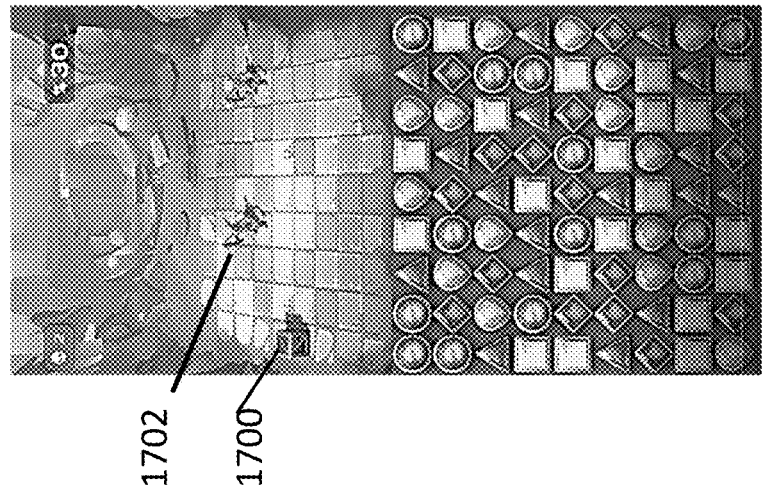
FIG. 17a shows a screen shot of the game board and battle area.

Reference is made to FIGS. 17a, b and c. FIG. 17a shows a game board and battle area. In the battle area is an item 1700 and two enemies 1702. In this example, the item is an obstacle in the form of a crate. For tactical reasons a player may need to remove the obstacle and/or may want to defeat the enemies. In some embodiments, a variety of different types of item and/or enemy may be provided. Some embodiments may allow a player to obtain information about the item and/or the enemy.

The user is able to provide user input via the user interface to select an item in the battle area. In the example shown in FIG. 17b, the user input provided via the user interface has selected the crate 1700. In response to the user input selecting the crate 1700, the at least one processor is configured to cause the display to display information 1704 about the crate. In some embodiments, this information may comprise one or more of the type of item, information identifying the item and information about one or more attack options required to break or remove the item. In this example, the type of item is an obstacle. The information identifying the item indicates that the item is a crate. In this example, the information about the attack options indicates that the crate can be broken by one hero attack or by 3 colour blasts.

It should be appreciated that when the user input selects the obstacle, the at least one processor is configured to alter the image of the battle area displayed on the display. In the case of the selected object, the battle area in the region of the crate is enlarged and not all of the battle area remains visible. This enlarging may be optional in some embodiments. The angle of view of the battle area may alternatively or additionally be altered such as shown in FIG. 17b. This may for example be the case where the object is close to an edge of the battle area as is the case in the example shown in FIG. 17b.

When the user provides a second user input via the user interface to select the obstacle, the at least one processor is configured to cause the display to revert to showing the image shown in FIG. 17a.

In the example shown in FIG. 17c, the user input provided via the user interface has selected the enemy 1702. In response to the user input selecting the enemy 1702, the at least one processor is configured to cause the display to display information 1706 about the enemy. In some embodiments, this information may comprise one or more of the type of item, information identifying the enemy, information about one or more attack options required to defeat the enemy, information about one or more attacks provided by the enemy, information about the remaining health of the enemy, information about the total health and information about the damage inflicted by the enemy. In this example, the following information is displayed. The type of item is an enemy. The information identifying the enemy indicates that the enemy is an FT-Hitter. In this example, the information about the attack options provided by the enemy indicates that the melee forest goblin chases attacks heroes with a vicious club. The current health of the enemy is indicated as being 160 and the total health of the enemy is indicated as 160 (in this example the enemy has its full health and has not yet lost any health). The damage provides by the enemy is indicated as 50.

It should be appreciated that when the user input selects the enemy, the at least one processor is configured to cause the display to display an altered image of the battle area. In the case of the selected enemy, the battle area in the region of the enemy is enlarged and not all of the battle area is visible. This may be optional in some embodiments. The angle of view may be changed. However in this example, as the enemy of FIG. 17c is in a central region of the battle area, no change or no significant change in the angle of view is provided.

When the user provides a second user input via the user interface to select the enemy, the at least one processor is configured to cause the display to revert to displaying the image shown in FIG. 17a.

In some embodiments, one or more blockers or obstacles may be provided in the game board and/or the battle area.

In some embodiments a blocker which is provided in the game area may be switched with a game element or a hero. Alternatively a blocker which is provided in the game area may be locked in position and cannot be switched. In some embodiments only locked blockers may be provided. In some embodiments only switchable blockers may be provided. In some embodiments, both locked blockers and switchable blockers may be provided. In some embodiments where both locked blockers and switchable blockers are provided, these may be provided in one or more common levels and/or in different levels of the game.

In some embodiments, a plurality of different blockers may be provided. The different blockers may have a different visual appearance. The visual appearance of the blocker may be dependent on a theme of the game level which is being played.

Some blockers when present may block a colour shot or other shot provided as a result of the matching of game elements, such as previously described. In some embodiments, when a given number of colour shots have been provided, the blocker may be removed. The colour shot which is blocked and/or used to remove the blocker is provided when a game element located in the column below the blocker is removed. The colour associated with the colour shot will be that of the removed game element.

Some blockers when present may prevent a hero located in the same column as the blocker but below the blocker from moving past the blocker. In some embodiments, that hero may be used to remove the blocker. In this latter case, the hero may be used to remove the blocker and is then removed from the game board. That hero is then not provided in the battle area.

Different blockers may different requirements for their removal. For example some blockers may be removed by a given number of hero hits and/or by a given number of colour shots. The given number of hero hits may be one or more. The given number of colour shots may be of one or more of a particular colour or colours. Alternatively the given number of colour shots may be of any colour.

In some embodiments, a blocker may be removed by making one or more matches adjacent the blocker or including a game element underlying the blocker. Where more than one match is required to remove the blocker, the appearance of the blocker may change each time a match is made until the required number of matches are made to remove the blocker. Such a blocker may alternatively be removed using one or more heroes.

In some embodiments, a blocker may be provided which may be only present for a given number of turns before being removed. For example, the blocker may be removed after 2 turns. In some embodiments, the blocker may additionally be removable by one or more actions such as one or more colour blasts and/or using one or more heroes. In other embodiments, this blocker may not be destroyed and may only be removed after the given number of turns.

In some embodiments, a blocker may be thrown onto the game board by an enemy in the battle area.

In some embodiments, one type of blocker may be visualised as a hole in the game board. This hole may not be destroyed. The position occupied by the hole may not be occupied by a game element or hero. The hole may or may not block the movement of the hero onto the battle area. The hole may or may not block colour shots.

Where a blocker is provided in the battle area, this may stop the progress of at least one type of hero and optionally all types of hero.

In some embodiments, the blocker in the battle area may block the progress of one or more enemies and optionally all types of enemy.

In some embodiments, a blocker in the battle area may block colour shot. One or more blockers may alternatively or additionally allow a colour shot to pass through it.

In some embodiments, the blocker may be removed by one or more colour shots (optionally of a particular colour) and/or by one or more hero hits.

In some embodiments, one or more blocker in the battle area may not be removed by any hero action and/or colour shots.

In some embodiments, a so-called boss mode may be provided. In this mode a large sized enemy is provided in the battle area. In this regard, reference is made to FIGS. 18a to 18d which shows one example of a large sized enemy. The larger sized enemy will be referred to a boss enemy in the following.

In some embodiments, the boss enemy may require a relatively large number of attacks to be beaten. The attacks may be provided by one or more heroes and/or one or more colour shots.

The boss enemy may occupy a plurality of grid positions in the battle area.

In some embodiments, there may be a plurality of different types of boss enemies. Different boss enemies may be of differing sizes. In some embodiments, the larger the boss enemy, the more powerful that boss enemy. Different types of boss enemies may provide different attacks.

In some embodiments, a player is provided with a number of lives associated with the playing of boss enemy. The number of these lives may be one or more. For example, the number of such lives may be 3. These lives are referred to as boss lives in the following. The at least one processor is configured update the number of boss lives as a player plays the boss enemy. In particular, the processor will update the number of boss lives each time the player loses a life.

In some embodiments, when these lives are used up, the level will be failed regardless of whether there are any remaining moves and/or heroes. The at least processor may be configured to determine when the player has used up all his lives or has no remaining lives. In response, the at least one processor is configured to end the boss enemy level. This may be considered as a failed level in some embodiments.

Reference is made to FIG. 18a which shows an example boss enemy 1800. The at least one processor is configured to cause the display to display a boss enemy 1800. This boss enemy may be located in the part of the battle area furthest from the game board. In some embodiments, the boss enemy may only occupy n rows furthest from the game board. n may be any suitable number such as 1 or 2.

This parts of the battle area occupied by the boss enemy may be dependent on the type of boss enemy.

In some embodiments, the boss enemy may move in the battle area. In some embodiments, such as shown in FIG. 18a, the at least one processor is configured to cause the display to display an indication 1802 of a next position of the boss enemy. This may indicate the direction in which the boss enemy will move when the player has made a move. In the example shown in FIG. 18a, the at least one processor is configured to cause the display to indicate the grid position next to the boss which indicates the direction in which the boss is moving. In this example, the boss enemy is able to move sideways along the back of the battle area. The indication shown in FIG. 18a indicates that the boss enemy will move by one grid position towards the right.

It should be appreciated that different movements may be used by different boss enemies, in some embodiments. In some embodiments, a boss enemy may have a more complex movement. In some embodiments, a boss enemy may move by more than one grid position. In some embodiments, the boss enemy may move towards and away for the game board alternatively or additionally. It should be appreciated that the same boss enemy may move differently in a level. This may be dependent on if the boss enemy is making an attack and/or the type of attack.

It should be appreciated that the boss enemy may move every time a move is made by the player. In other embodiments, the boss may move less frequently. In some embodiments, the boss may remain at a given position in the battle area for several moves of the player. This may be for example when the boss enemy is launching a so called high damage attack.

In some embodiments, a boss enemy may have a so-called high damage attack mode. If the boss enemy is able to make this high damage attack, the player will loss a boss life. The usual boss attacks will not have an impact on the boss lives of a player. In some embodiments, such a high damage attack may be foreshadowed to allow the player an opportunity to prevent this high damage attack.

Some examples of the foreshadowing of the attack will now be described with reference to FIGS. 18b to 18d. In the example shown, the big attack is provided by the boss enemy holding a big rock over his head. This rock will be thrown after a given number of turns. The given number of turns can be any number of turns. For example, the given number of turns is 5. However, is should be appreciated that the given number of turns may be greater than 5 or less than 5.

As shown in FIG. 18b, the at least one processor is configured to cause the display to display a first indication 1804. This first indication indicates that a high damage attack is coming shortly. This first indication is optional in some embodiments. In this example, the at least one processor is configured to cause a light or visual representation of energy to be displayed above the head of the enemy to provide the first indication.

It should be appreciated that this first indication may be provided in any suitable way. In the example shown in FIG. 18b, the indication is a visual indication. Any other suitable visual indication may alternatively or additionally be provided. Alternatively or additionally the indication may be an audio indication.

Figures 18C, 18D:

Reference is made to FIG. 18c. The at least one processor is configured to cause the display to display a show a second indication 1806 which is displayed to indicate that a count down to a big attack is about to start. This may be displayed above the image of the boss enemy 1800. In this example, the second indication comprises the words "big attack". However, it should be appreciated that this is by way of example only and any other suitable indication may alternatively or additionally used. Any other suitable visual indication may alternatively or additionally be provided. Alternatively or additionally the indication may be an audio indication.

In some embodiments, the first indication 1804 may optionally be continued to be displayed while the second indication is displayed. Alternatively, the first indication may not be displayed when the second indication is displayed.

It should be appreciated that in some embodiments, only the first indication or the second indication may be provided. In some embodiments, neither the first indication nor the second indication are provided. In some embodiments, both the first indication and the second indication may be provided. In some embodiments which one, both or none of the indications are provided may be dependent on the type of the boss enemy.

A health bar 1808 is displayed above the boss enemy. This health bar is discussed in more detail in relation to FIG. 18d.

Reference is made to FIG. 18d.

The health of the enemy may comprise a maximum value. This is the health value of the enemy at the beginning of the boss mode. This is represented by the length of the health bar 1808. The part of the health 1808c which has been lost is provided at one end of the bar in one colour. The remaining part of the health bar represents the health of the enemy. When the boss enemy is about to go into the big attack mode or starts the big attack mode, the remaining health bar is divided into a first part 1808a and a second part 1808b. The first part and the second part may be displayed in a visually distinct manner from each other and from the used part of the health. In some embodiments, the user has to make enough attacks to cause the boss enemy to lose all the second part of the health 1808b before the end of the countdown to avoid the big attack. If the user does not make sufficient attacks to cause the boss enemy to lose that second part of the health, the big attack take places.

The at least one processor is configured to determine how many moves a player has before the boss enemy launches the big attack. The at least one processor is configured to cause information about the number of moves left until the big attack to be displayed on the display. This information may be displayed in any suitable manner. In the example shown in FIG. 18d, a plurality of chevrons is displayed ending in a cross. Each chevron represents a move and the cross represents the move in which the big attack will be launched by the boss enemy. When a move has been used, the appearance of the chevron will be changed such that the user is provided with an indication of the remaining moves.

Alternatively or additionally a separate counter may be displayed to indicate the number of moves left until there is a big attack.

The at least one processor may be configured to select a colour characteristic for the boss enemy. In some embodiments, a boss enemy may always be associated with a same colour characteristic during a boss mode. Alternatively, a different colour characteristic may be selected for the boss enemy for a next attack. The at least one processor may be configured to cause the display to display information indicating the selected colour characteristic. In the example of FIG. 18d, the body of the boss enemy will include the selected colour as the displayed information. Colour shots of the selected colour will damage the boss hero.

In some embodiments, there may be no colour associated with the boss enemy. A colour shot may have no effect in that alternative or a colour shot of any colour will have an effect on the boss enemy.

It should be appreciated that different types of attacks may be associated with different enemies. It should be appreciated that the count down to a big attack may be the same or different for different boss enemies.

Figure 19:
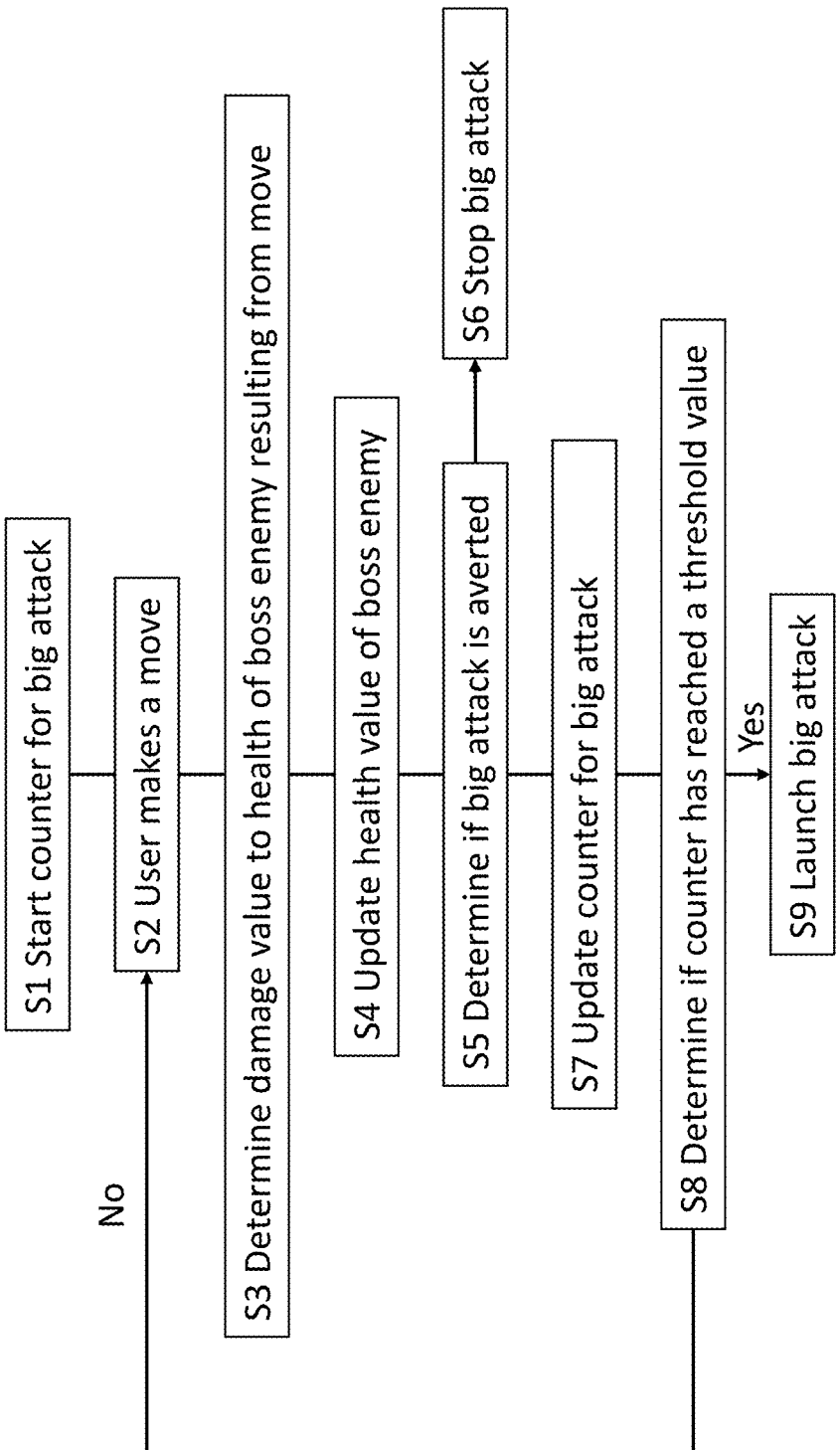
FIG. 19 shows a method flow of some embodiments.

Reference is made to FIG. 19 which shows a method flow of some boss enemy embodiments.

In step S1, the at least one processor is configured to start a counter for a big attack. The counter may be a count up counter or a count down counter. The counter may count the number of moves which the user has before the big attack is provided. When a threshold number of moves have been made or the remaining number of moves is zero, the at least one processor is configured to cause the hero boss to launch a so-called big attack. The at least one processor may be configured to cause the display to display information indicating that the counter for the big attack has been started. The displayed information may be as previously described.

In some embodiments, the at least one processor may be configured to start the counter in response to one or more criteria. For example the at least one processor may be configured to start the counter when the user has made a threshold number of moves or when there is a threshold number of moves remaining. In some embodiments, the criteria may alternatively or additionally be responsive to game play of the user.

In step S2, the user provides user input via the user interface to make a move. The move may or may not result in an attack being made on the enemy. The at least one processor may be configured to cause the display to display the move and any attack which is made on the enemy.

In step S3, the at least one processor is configured to determine if the move made by the user resulted in damage to the health of the boss enemy and if so, a value associated with that damage.

In step S4, the at least one processor is configured, where there has been some damage, to update the health value of the boss enemy using the damage value. The at least one processor may be configured to cause the display to display information indicating the damage to the health of the enemy.

In step S5, the at least one processor is configured to determine based on the updated health value if the big attack is averted.

In some embodiments, the big attack is averted if the enemy loses a given amount of health since the counter for the big attack started. In some embodiments, a value of an amount of health lost or damage done is updated each time the user makes a move after the start of the counter for the big attack. When the value is updated, this updated value is compared to a threshold value to determine if the big attack is averted.

In some embodiments, the big attack is averted if the given amount of remaining health falls below a threshold value. When the value of the remaining health is updated, the updated value may be compared to the threshold value.

If it is determined that the big attack is averted, then the next step is step S6 and the attack is stopped. This may remove the counter for the big attack. The at least one processor may be configured to cause the display to display information indicating that the big attack has been averted.

If it is determined that the big attack is not averted, the next step is step S7. The at least one processor is configured to update the big attack counter. The at least one processor may be configured to cause the display to display information indicated the updated value of the big attack counter.

In step S8, the at least one processor is configured to determine if the counter has reached the threshold value. If not, the next step is step S2.

If it is determined that the counter has reached the predetermined threshold value, the at least one processor is configured to cause the enemy to launch a big attack in step S9. This may be as previously described. The at least one processor may be configured to cause the display to display the boss enemy launching the big attack. This may result in the user losing a boss life, such as previously described.

In some embodiments, one or more of the previous steps may be combined and/or the order of one or more steps may be changed. For example the step S7 may take place any other suitable time after step S2. Steps S3 and S4 may be combined. Step S5 may take place after step S8.

This method has been described in relation to a boss enemy. In other embodiments, the enemy may be any other suitable enemy. That enemy may not be a larger enemy. The enemy may be a more powerful enemy in some embodiments.

Figure 14:
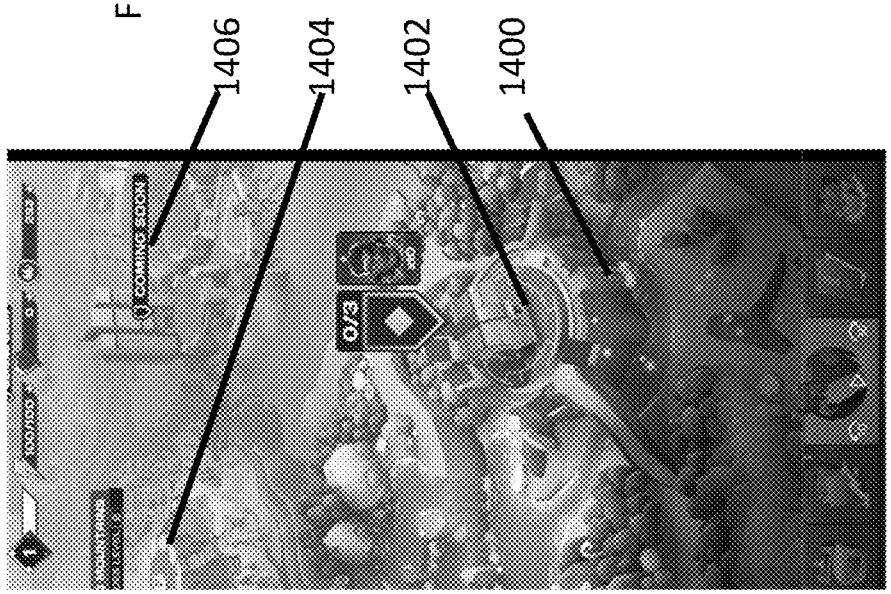
FIG. 14 shows an example of a map of different game areas of some embodiments.

Reference is made to FIG. 14 which shows one example where a map 1400 is provided. The map comprises a plurality of different areas. In the example shown there are three different areas. The first area 1402 is currently unlocked and available for selection. When the user provides user input to select that area via the user interface, the at least one processor may be configured to allow the user to play one or more levels within that area. The other areas 1404 and 1406 are not currently available for selection. The at least one processor may be configured to cause information to be displayed to indicate if an area is available for selection. In some embodiments, information about one or more areas may be displayed. For example an area may represent an ice area, a storm area or the like. The at least one processor may be configured to display information indicating when an unavailable area is available or indicating a level of hero and/or type of hero required to play that game. This may be the level of the heroes in the selected set of heroes. In some embodiments, not all heroes may be used in the set of heroes in all areas. In some embodiments, one or more of the areas may require one or more particular heroes in order to be played.

It should be appreciated that in the described embodiments a switcher mechanic is used. In other embodiments, any other suitable matching mechanic can be used such as a slider or a linker matching mechanism.

Figure 13:
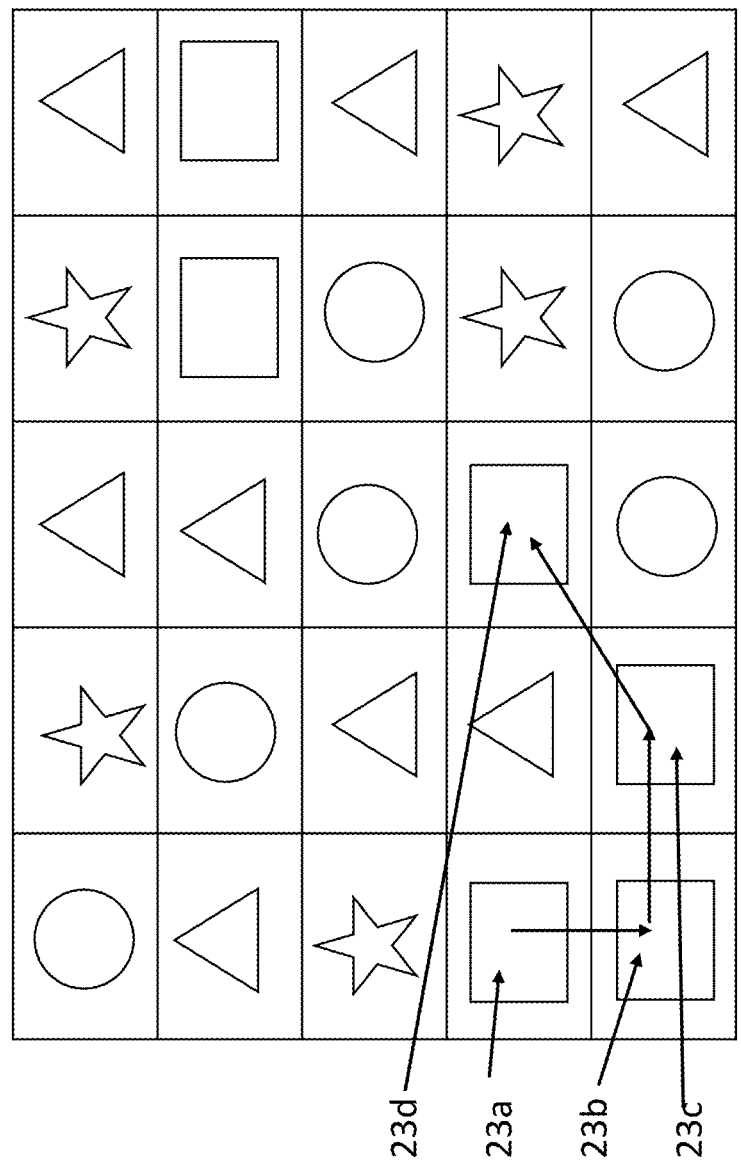
FIG. 13 shows an example of a linker mechanic of some embodiments.

For example, some embodiments may be used with a linker type matching mechanism. Reference is made to FIG. 13. In a linker mechanism, a user is configured to provide a user input to select a chain of game elements sharing a common characteristic on a game board. The game board area may be similar or the same as the game board areas previously described. If the chain of game elements satisfy a given criteria, the at least one processor may be configured to determine that a match has been made and to remove those game elements. A hero may be provided. The hero which is provided may be dependent on the length of the chain and/or the shape of the chain. The hero provided may be dependent on a characteristic of the matching game elements such as previously described.

By way of example and with reference to FIG. 13, a user provides a first user input to select a first game element 23*a*. The user input continues to an adjacent game element 43*b* of the same characteristic and so on to third and fourth game elements 23*c* and 23*d*. The user input may be provided by a user touching the touchscreen to select the first game element and then dragging his finger to the next game element and so on. The game elements which are selected have the same game characteristic. It should be appreciated that an equivalent mechanism may be provided using an input device such as a mouse or the like. There may be rules regarding the selection of an adjacent game element. For example some embodiments may consider only game elements above, below, to the right and to the left as being adjacent. In some embodiments, game elements diagonally adjacent to the selected game element may be additionally be considered to be adjacent.

The position of the hero provided may be the location of the beginning of the chain. In some embodiments, the position of the hero may be at the end of the chain. In some embodiments, the position of the hero may be at a position of one of the game elements of the chain. The hero may be provided at a middle location. Where the chain has an even number of game elements the middle position closer to the beginning or the end of the chain may be selected as the location of the hero. In some embodiments the at least one processor may be configured to select a position for the hero along the chain on a "random" or "pseudo random" basis.

In some embodiments, the game board area and the battle area may be displayed using a portrait mode with respect to a screen of a device. The game board area may be below the battle area as shown in the previously described embodiments. In other embodiments, the game board area may be above the battle area. In some embodiments, a battle area may be provided with part of the game board area above the battle area and part of the game board area below the battle area. In some embodiments, a game board area may be provided with part of the battle area above the game board area and part of the battle area below the game board area. In some embodiments, the game board area and the battle area may be arranged side by side with respect to each other, with one of the game board area and the battle area being on the right side of the screen and the other of the game board area and the battle area being on the left side of the screen.

In some embodiments, the game board area and the battle area may be displayed using a landscape mode with respect to a screen of a computer device. In some embodiments, the game board area and the battle area may be arranged side by side with respect to each other, with one of the game board area and the battle area being on the right side of the screen and the other of the game board area and the battle area being on the left side of the screen. In some embodiments, a battle area may be provided with part of the game board area to one side of the battle area and part of the game board area to the other side of the battle area or vice versa. In other embodiments, the game board area may be above the battle area or vice versa.

In some embodiments, a hero is only created when a match comprises four or more game elements. However, it should be appreciated that in some embodiments, a hero may be created when there are fewer than four matching game elements. For example three matching game elements may cause a hero to be created. In some embodiments, a match may require more than four matching game elements before a hero is created.

It should be noted that the matching patterns required to create the heroes is by way of example only and different embodiments may require one or more additional or alternative patterns.

In some embodiments a plurality of different types of heroes are created. In other embodiments, there may be a single type of hero created.

In some embodiments, heroes are created in the game board area. In other embodiments, any other suitable game entity may be created in the game board area which can be used in a second part. This second part may be a battle area such as previously described. However in other embodiments, this area may be any suitable interaction area.

The game board area and the interaction area may both have a row and column arrangement with correspondence between either: the rows of the game board area and the rows of the interaction area; or the columns of the game board area and the columns of the interaction area.

In some embodiments, the interaction area is a battle area with one or more enemies. However, in other embodiments, the interaction area may comprise one or more interaction area entities. The game entities created in the game board area may interact with one or more of the interaction area entities to achieve one or more game objectives. This may for example to remove one or more of the interaction area entities.

Some example embodiments may provide methods for introducing complexity into computer implemented games. This may be particularly challenging when considering small screen devices, where complex game arrangements may be difficult to display due to the limitations imposed by the devices in terms of processing capability and display size. By providing any of the abovementioned methods, some example embodiments may allow strategic diversity in gameplay, and therefore introduce a further level of complexity to the computer implemented game, without placing undue burden on processing or display requirements. As such, some embodiments may also drive user engagement with the computer implemented game by making the game more complex and challenging.

It should be appreciated that several of the embodiments have been described in the context of a computer implemented game played on a mobile device. However, it should be appreciated that other embodiments may be played on any other suitable computer device such as a compute console, a laptop or a desktop or gaming computer.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device configured to provide a computer implemented game, the computer device comprising:
 a display configured to display:
  a grid of a game board area of the computer implemented game, the grid of the game board area having a plurality of rows and columns with a plurality of game elements positioned in the grid, the game elements having a respective shape and color with different ones of the game elements having different shapes and colors, the plurality of game elements being configured to be selected by user input to cause a match; and
  an interaction area of the computer implemented game, the interaction area being outside the game board area and displaying one or more enemies;
 a user interface configured to receive first user input interacting with the game board area to make a move; and
 at least one processor configured to:
  in response to the first user input, determine that one or more match conditions have been satisfied by a plurality of adjacent game elements in the game board area having at least one of the same color and the same shape;
  in response to the satisfying of the one or more match conditions, cause one or more game entities to be provided at respective positions in the grid of the game board area, the one or more game entities depicting a respective hero;
  receive second user input;
  in response to the second user input, cause one or more of the one or more game entities to move to and stop at a different respective position in the grid of the game board area;
  move one or more of the one or more game entities from the game board area to the interaction area; and
  simulate an attack by one or more of the one or more game entities in the interaction area against one or more of the enemies of the interaction area.

2. The computer device as claimed in claim 1, wherein the at least one processor is configured to control a visualization of the one or more game entities to be the same in the game board area and in the interaction area.

3. The computer device as claimed in claim 1, wherein the at least one processor is configured to control a visualization of the one or more game entities in the game board area to be different from a visualization of the one or more game entities in the interaction area.

4. The computer device as claimed in claim 1, wherein the at least one processor is configured to control one or more of the one or more game entities to move to a respective position in the interaction area in dependence on a location of the respective game entity in the game board area.

5. The computer device as claimed in claim 1, wherein the interaction area comprises a plurality of rows and columns defining respective positions for the game entities.

6. The computer device as claimed in claim 5, wherein the columns of the grid of the game board area are aligned with the columns of the interaction area providing aligned columns and the at least one processor is configured to cause a respective game entity located at a respective position in a column of the grid of the game board area to move to a respective defined position in an aligned column of the interaction area.

7. The computer device as claimed in claim 5, wherein the rows of the grid of the game board area are aligned with the rows of the interaction area providing aligned rows and the at least one processor is configured to cause a respective game entity located at a respective position in a row of the grid of the game board area to move to a respective defined position in the aligned row of the interaction area.

8. The computer device as claimed in claim 1, wherein the user interface is configured to receive a user input selecting a game entity and in response to the user input selecting the game entity, the at least one processor is configured to cause the selected game entity to move from the game board area to the interaction area.

9. The computer device as claimed in claim 1, wherein the user interface is configured to receive a user input selecting and moving a game entity from one position in the game board area to another position in the game board area and in response to the user input selecting and moving a game entity, the at least one processor is configured to cause the selected game entity to move from the game board area to the interaction area.

10. The computer device as claimed in claim 1, wherein the at least one processor is configured to cause the one or more game entities moved from the game board area to the interaction area to simulate an attack with one or more enemies located in a respective interaction pattern of one of the game entities.

11. The computer device as claimed in claim 10, wherein the at least one processor is configured to cause a plurality of game entities to move to the interaction area and to determine an order for the plurality of game entities in dependence on respective interaction patterns of the plurality of game entities.

12. The computer device as claimed in claim 1, wherein the user interface is configured to receive user input to select a game entity in the game board area and in response the at least one processor is configured to cause the display to highlight a path that would be taken by the game entity when moving to the interaction area while the game entity continues to be associated with its respective position in the game board area.

13. The computer device as claimed in claim 1, wherein the user interface is configured to receive user input to select a game entity and in response the at least one processor is configured to cause the display to highlight a path that would be taken by the game entity when moving to the interaction area and to highlight in the interaction area a respective interaction pattern associated with the game entity while the game entity continues to be associated with its respective position in the game board area.

14. The computer device as claimed in claim 1, wherein the at least one processor is configured to determine a respective position in the interaction area for one or more game entities in dependence on the position of at least one of:
  one or more enemies; and
  one or more other game entities.

15. The computer device as claimed in claim 1, wherein the at least one processor is configured to determine a respective position in the interaction area for one or more game entities in dependence on at least one of:
  an interaction pattern of that game entity; and
  a respective position of one or more enemies.

16. The computer device as claimed in claim 1, wherein the at least one processor is configured to determine a number of game elements satisfying a match condition and in response to cause one of a plurality of different game entities to be provided.

17. The computer device as claimed in claim 1, wherein the at least one processor is configured to determine a matching characteristic of game elements satisfying a match condition and in response to select one of a plurality of different game entities to be provided.

18. The computer device as claimed in claim 1, wherein the user interface is configured to receive user input which results in the selection of two game entities and in response the at least one processor is configured to provide one game entity which differs in at least one respect to the selected two game entities.

19. The computer device as claimed in claim 18, wherein the one game entity is capable of providing a greater effect in the interaction area in at least one respect as compared to at least one of the selected two game entities.

20. The computer device as claimed in claim 18, wherein the user interface is configured to receive user input moving one of the two game entities to a position of the other of the two game entities to select the two game entities.

21. The computer device as claimed in claim 20, wherein the one entity has at least one same characteristic as the moved one game entity.

22. The computer device as claimed in claim 1, wherein the user interface is configured to receive user input selecting two game entities and in response the at least one processor is configured to provide a set of game entities comprising at least three game entities.

23. The computer device as claimed in claim 1, wherein the user interface is configured to receive user input selecting two game entities satisfying at least one criteria and in response the at least one processor is configured to provide a set of game entities comprising a number of game entities equal to one of a number of columns and a number of rows of the interaction area.

24. A computer implemented method provided by a computer device configured to provide a computer implemented game, the method comprising:
  displaying, by a display of the computer device:
    a grid of a game board area of the computer implemented game, the grid of the game board area having a plurality of rows and columns with a plurality of game elements positioned in the grid, the game elements having a respective shape and color with different ones of the game elements having different shapes and colors, the plurality of game elements being configured to be selected by user input to cause a match; and
    an interaction area of the computer implemented game, the interaction area being outside the game board area and displaying one or more enemies;
  receiving, by a user interface of the computer device, first user input interacting with the game board area to make a move;
    in response to the first user input, determining, by at least one processor of the computer device that one or more match conditions have been satisfied by a plurality of adjacent game elements in the game board area having at least one of the same color and the same shape;
    in response to the satisfying of the one or more match conditions, causing one or more game entities to be provided at respective positions in the grid of the game board area, the one or more game entities depicting a respective hero;
  receiving second user input;
    in response to the second user input, causing one or more of the one or more game entities to move to and stop at a different respective position in the grid of the game board area;
    moving, by the at least one processor, one or more of the one or more game entities from the game board area to the interaction area; and
    simulating, by the at least one processor, an attack by one or more of the one or more game entities in the interaction area against one or more of the enemies of the interaction area.

25. A non-transitory computer readable storage medium comprising computer executable instructions that, when executed by at least one processor of a computer device cause the computer device to:
  display, by a display of the computer device:
    a grid of a game board area of the computer implemented game, the grid of the game board area having a plurality of rows and columns with a plurality of game elements positioned in the grid, the game elements having a respective shape and color with different ones of the game elements having different shapes and colors, the plurality of game elements being configured to be selected by user input to cause a match; and
    an interaction area of the computer implemented game, the interaction area being outside the game board area and displaying one or more enemies;
  receiving, by a user interface of the computer device, first user input interacting with the game board area to make a move;
  in response to the first user input, determining, by at least one processor of the computer device that one or more match conditions have been satisfied by a plurality of adjacent game elements in the game board area having at least one of the same color and the same shape;
  in response to the satisfying of the one or more match conditions, causing one or more game entities to be provided at respective positions in the grid of the game board area, the one or more game entities depicting a respective hero;
  receiving second user input;
  in response to the second user input, causing one or more of the one or more game entities to move to and stop at a different respective position in the grid of the game board area;
  moving, by the at least one processor, one or more of the one or more game entities from the game board area to the interaction area; and simulating, by the at least one processor, an attack by one or more of the one or more game entities in the interaction area against one or more of the enemies of the interaction area.

\* \* \* \* \*